(12) United States Patent
Ida et al.

(10) Patent No.: US 12,306,601 B2
(45) Date of Patent: *May 20, 2025

(54) INFORMATION PROCESSING DEVICE AND INFORMATION PROCESSING METHOD

(71) Applicant: SONY GROUP CORPORATION, Tokyo (JP)

(72) Inventors: Kentaro Ida, Tokyo (JP); Honoka Ozaki, Tokyo (JP); Shogo Kawata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 437 days.

This patent is subject to a terminal disclaimer.

(21) Appl. No.: 17/770,337

(22) PCT Filed: Oct. 14, 2020

(86) PCT No.: PCT/JP2020/038710
§ 371 (c)(1),
(2) Date: Apr. 20, 2022

(87) PCT Pub. No.: WO2021/085126
PCT Pub. Date: May 6, 2021

(65) Prior Publication Data
US 2022/0390912 A1    Dec. 8, 2022

(30) Foreign Application Priority Data
Oct. 28, 2019 (JP) .................. 2019-195188

(51) Int. Cl.
*G05B 19/042* (2006.01)
*H04N 23/00* (2023.01)

(52) U.S. Cl.
CPC .... *G05B 19/042* (2013.01); *G05B 2219/2642* (2013.01); *H04N 23/00* (2023.01)

(58) Field of Classification Search
CPC .......... G05B 19/042; G05B 2219/2642; H04N 23/00

(Continued)

(56) References Cited

U.S. PATENT DOCUMENTS

| 11,573,558 B2* | 2/2023 | Cella ...................... G06N 20/00 |
| 2005/0159823 A1* | 7/2005 | Hayes ................. H04L 12/2803 |
| | | 700/19 |

(Continued)

FOREIGN PATENT DOCUMENTS

| CN | 104094584 A | 10/2014 |
| CN | 104662951 A | 5/2015 |

(Continued)

OTHER PUBLICATIONS

International Search Report and Written Opinion of PCT Application No. PCT/JP2020/038710, issued on Jan. 12, 2021, 08 pages of ISRWO.

*Primary Examiner* — Md Azad
(74) *Attorney, Agent, or Firm* — CHIP LAW GROUP

(57) ABSTRACT

An information processing device that includes a control unit that specifies an output target electric device from a plurality of electric devices that outputs information to a user based on a sensor level corresponding to a detection resolution of a sensor included in each of the plurality of electric devices and an elapsed time since a detection of a user by the sensor included in each of the plurality of electric devices.

19 Claims, 21 Drawing Sheets

(58) Field of Classification Search
USPC .......................................................... 700/19
See application file for complete search history.

(56) References Cited

U.S. PATENT DOCUMENTS

| | | | |
|---|---|---|---|
| 2007/0032887 A1* | 2/2007 | Muroi | G06Q 10/06 |
| | | | 700/86 |
| 2014/0040959 A1 | 2/2014 | Oyman | |
| 2015/0002291 A1 | 1/2015 | Kizuki | |
| 2015/0207644 A1* | 7/2015 | An | H04W 4/024 |
| | | | 455/420 |
| 2016/0342190 A1* | 11/2016 | Enohara | H05B 47/155 |
| 2017/0010658 A1 | 1/2017 | Tanaka et al. | |
| 2020/0359486 A1* | 11/2020 | Ogawa | H05B 47/125 |
| 2024/0163338 A1* | 5/2024 | Binder | G07C 3/02 |

FOREIGN PATENT DOCUMENTS

| | | |
|---|---|---|
| CN | 105960196 A | 9/2016 |
| EP | 2880813 A | 6/2015 |
| EP | 3089657 A2 | 11/2016 |
| JP | 2012-137828 A | 7/2012 |
| JP | 2012-160295 A | 8/2012 |
| JP | 2013-162314 A | 8/2013 |
| JP | 2016-076799 A | 5/2016 |
| JP | 2017-513092 A | 5/2017 |
| JP | 2018-023169 A | 2/2018 |
| KR | 10-2015-0047590 A | 5/2015 |
| KR | 10-2016-0107261 A | 9/2016 |
| WO | 2014/022018 A1 | 2/2014 |
| WO | 2015/127059 A2 | 8/2015 |

* cited by examiner

Fig. 8

| HOME APPLIANCE | EXAMPLE OF SENSOR DETECTION |
|---|---|
| REFRIGERATOR | DOOR OPENING/CLOSING OPERATION |
| MICROWAVE OVEN | DOOR OPENING/CLOSING, SETTING CHANGE, START OPERATION FOR REHEATING MEAL |
| ELECTRIC KETTLE | POWER, TEMPERATURE ADJUSTMENT OPERATION |
| VENTILATION FAN | POWER, WIND POWER SETTING OPERATION |
| STOVE | POWER, THERMAL POWER ADJUSTMENT OPERATION |
| RICE COOKER | LID OPENING/CLOSING, RICE COOKING SETTING CHANGE OPERATION |

Fig. 10

| Operation Code (8bit) | Optional (8bit) | MAC Address (48bit) |

Fig. 11

[Operation Code]
1:QUERY
2:NOTIFY
3:TRIGGER
4:ACK
5:NAK

Fig. 12

| Operation Code (8bit) | Reserved (8bit) | MAC Address (48bit) | Sensor Level (3bit) | Detect (1bit) | Elapse Time (12bit) |

Fig. 13

```
[Sensor Level]
1:Level 1
2:Level 2
3:Level 3
```

Fig. 14

[Detect]
0:Undetected
1:Detected

Fig. 15

[Elapse Time]
0 – 4095(sec)

Fig. 17

[Operation Code]
1:QUERY
2:NOTIFY
3:TRIGGER
4:ACK
5:NAK
6:TRACKING

INFORMATION PROCESSING DEVICE AND INFORMATION PROCESSING METHOD

TECHNICAL FIELD

The present technology relates to an information processing device, an information processing method, and a program, and more particularly, relates to an information processing device, an information processing method, and a program capable of specifying a more appropriate output target device.

BACKGROUND ART

Conventionally, a technique for detecting which room a user is in using sensor data from a device having a motion sensor for detecting a user has been proposed (see, for example, PTL 1 and 2).

CITATION LIST

Patent Literature

PTL 1

JP 2012-160295 A

PTL 2

JP 2012-137828 A

SUMMARY

Technical Problem

By the way, when outputting various types of information to the user from an arbitrary device, if data from a device that does not have a motion sensor can be used, a more appropriate output target device can be specified and the information can be output.

The present technology was made in view of such a situation, and enables a more appropriate output target device to be specified.

Solution to Problem

An information processing device according to one aspect of the present technology is an information processing device including a control unit that specifies an output target electric device that outputs information to a user based on a sensor level corresponding to a detection resolution of a sensor included in the electric device.

An information processing method according to one aspect of the present technology is an information processing method for allowing an information processing device to specify an output target electric device that outputs information to a user based on a sensor level corresponding to a detection resolution of a sensor included in the electric device.

A program according to one aspect of the present technology is a program for causing a computer to function as an information processing device including a control unit that specifies an output target electric device that outputs information to a user based on a sensor level corresponding to a detection resolution of a sensor included in the electric device.

In the information processing device, information processing method, and program of one aspect of the present technology, the output target electric device that outputs information to the user is specified based on the sensor level corresponding to the detection resolution of the sensor included in the electric device.

The information processing device according to still another aspect of the present technology may be an independent device or may be an internal block in which one device is configured.

BRIEF DESCRIPTION OF DRAWINGS

FIG. 8 is a diagram showing an example of sensor data detected by a sensor other than a motion sensor.

FIG. 10 is a diagram showing an example of a configuration of a trigger signal.

FIG. 11 is a diagram showing an example of Operation Code.

FIG. 12 is a diagram showing an example of a configuration of a reply signal.

FIG. 13 is a diagram showing an example of Sensor Level.

FIG. 14 is a diagram showing an example of Detect.

FIG. 15 is a diagram showing an example of Elapse Time.

FIG. 17 is a diagram showing another example of Operation Code.

DESCRIPTION OF EMBODIMENTS

1. Embodiments of Present Technology

In recent years, various home appliances have become smarter, and in response to the trend of IoT (Internet of Things), technologies for integrated control of a plurality of appliances including indoor white goods are requested.

As a technology for integrated control of a plurality of home appliances, for example, a mechanism such as DLNA (registered trademark) (Digital Living Network Alliance) in which so-called black goods, especially AV (Audio Visual) devices, are connected via a network to share and play content has been developed 15 years ago.

On the other hand, with regard to so-called white goods, standards for integrated control of a plurality of white goods have not yet been developed and established. Therefore, there remains a problem regarding cooperation between white goods.

Many white goods, especially single-function and simple devices, do not have sensors for detecting people and the environment, and it is difficult to perform integrated processing according to the user's position.

Even in the DLNA standard, which is ahead in this field, a device that plays content needs to be manually operated by a user, and no product with functions such as automatic playback from the home appliance closest to the user has been announced.

In such a situation, there is an increasing need for functions such as automatic switching to a home appliance (white good) closest to the user in order to keep an environment optimal at all times such that a notification is effectively sent to a user in a predetermined space such as home, and audio output of hands-free calling of the moving user or a TV receiver is output from a speaker close to the user.

Therefore, in the present technology, a home appliance that is supposed to be closest to the user is specified as an output target according to the user's usage status of the home appliances, so that information can be output to the output target home appliance regardless of whether the home appliance has a motion sensor. Hereinafter, embodiments of the present technology will be described with reference to the drawings.

(Configuration Example of Device Control System)

Figure 1:
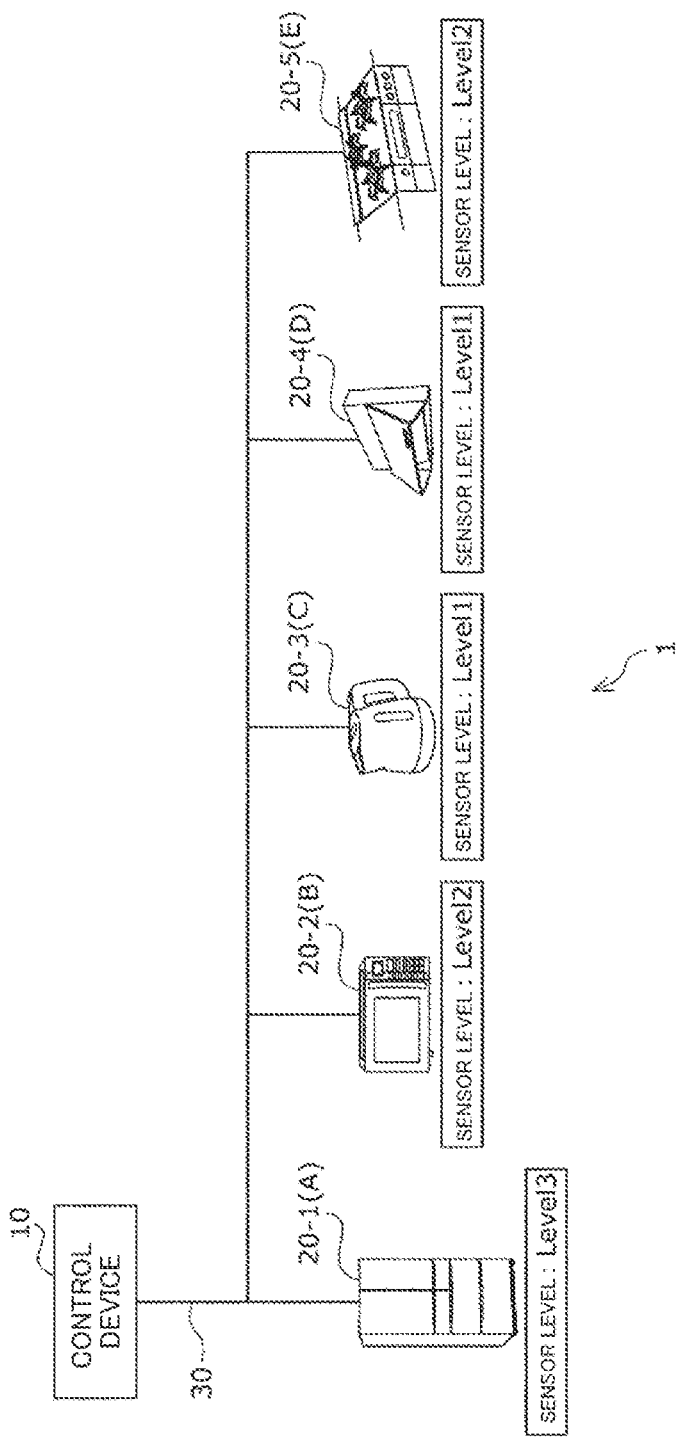
FIG. 1 is a diagram showing an example of a configuration of an embodiment of a device control system to which the present technology is applied.

FIG. 1 is a diagram showing an example of a configuration of an embodiment of a device control system to which the present technology is applied.

In FIG. 1, a device control system 1 includes a control device 10 and home appliances 20. In the device control system 1, the control device 10 and the home appliances 20 are connected to each other via a network 30.

The network 30 has a configuration for realizing wireless communication by a predetermined communication method such as a wireless LAN (Local Area Network) or 4G or 5G. The network 30 may partially include wired communication.

The control device 10 is an electronic device such as a personal computer, a server, or a smartphone. The control device 10 has a function (host computer function) for integrally controlling the home appliances 20 connected to the network 30.

The control device 10 specifies an output target home appliance 20 that outputs various types of information to the user by communicating with the plurality of home appliances 20 via the network 30, and performs control so that information is output from the specified home appliance 20.

Various types of information include various pieces of information that can be presented to the user, such as sound, images (still images, moving images), messages, and schedules. These pieces of information are not limited to those recorded by the control device 10, but may be received from, for example, other devices (smartphones and the like) connected to the network 30 or a server (server on the cloud) connected to the Internet.

The home appliances 20 are a white goods such as a refrigerator and a microwave oven. In FIG. 1, as an example of the home appliances 20, a refrigerator 20-1(A), a microwave oven 20-2(B), an electric kettle 20-3(C), a ventilation fan 20-4(D), and a stove 20-5(E) are illustrated. When it is not necessary to distinguish the respective home appliance, it is referred to as the home appliance 20.

The home appliance 20 is assigned a sensor level corresponding to the detection resolution of the sensor included in each home appliance 20. As the sensor level, for example, three stages of Level 1 to Level 3 can be used.

Level 1 is assigned to a home appliance 20 that is rarely operated after a power operation was performed, that is, does not require an operation (requires almost no operation) even when the user is in front of the device. Specifically, as devices whose operation frequency by the user is once an hour or less, for example, the electric kettle 20-3, the ventilation fan 20-4, a dishwasher (not shown), and the like are included in the home appliance 20 corresponding to the sensor level of Level 1.

Level 2 is assigned to a device having specifications for continuous operation such as a function operation by the user, that is, the home appliance 20 that the user is in the place during the operation but is not in the place when the user does not perform an operation. Specifically, as a device whose operation frequency by the user is about once every 10 minute, for example, the microwave oven 20-2 and the stove 20-5 are included in the home appliance 20 corresponding to the sensor level of Level 2.

Level 3 is assigned to the home appliance 20 having a sensor such as a motion sensor that can immediately detect a user within a certain range. Specifically, the refrigerator 20-1 having a motion sensor and the like are included in the home appliance 20 corresponding to the sensor level of Level 1.

Figure 2:
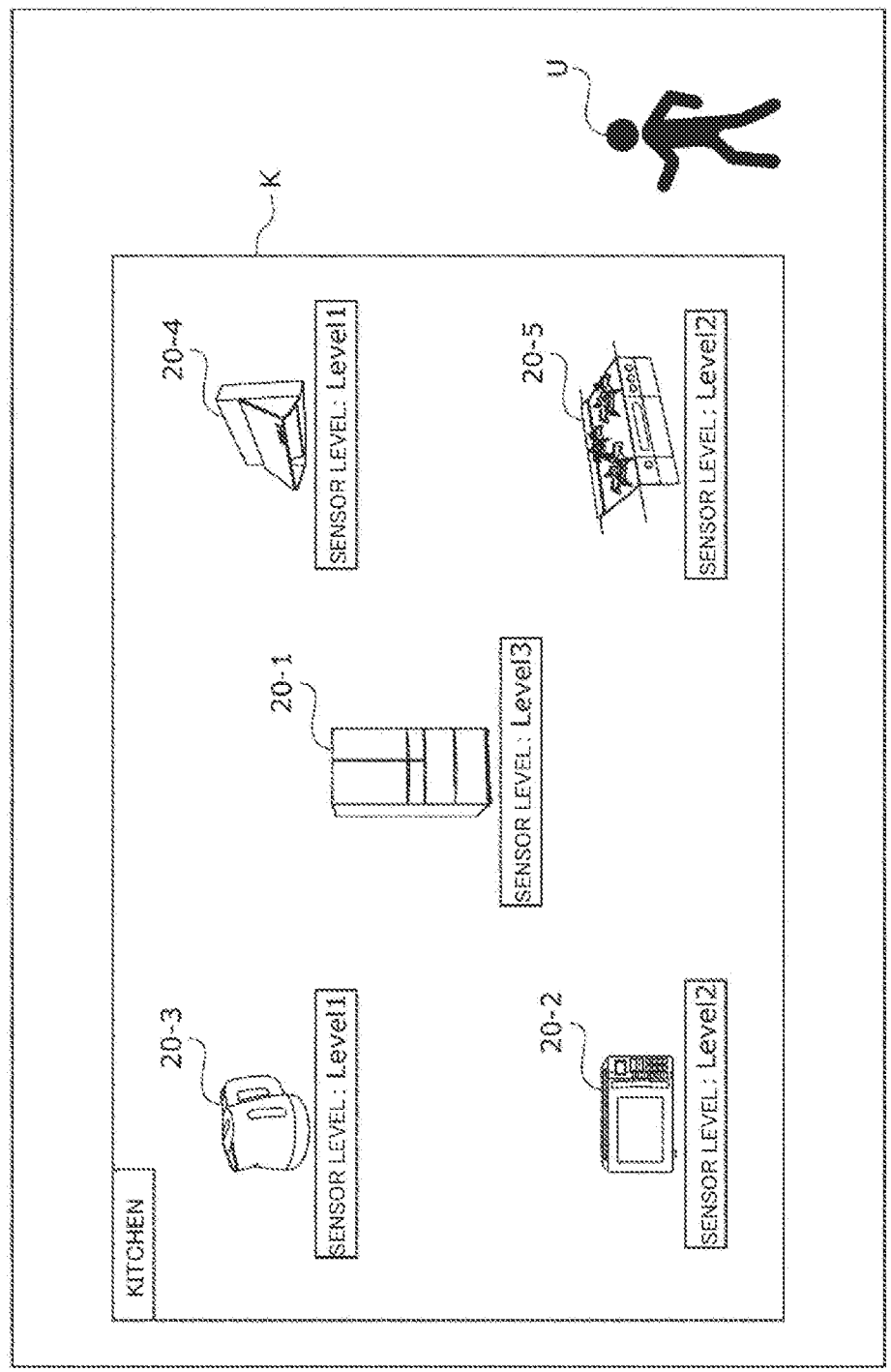
FIG. 2 is a diagram showing an example of integrated control in a situation where a user is acting in an environment in which a home appliance having a sensor level is installed.

FIG. 2 shows an example of integrated control of the home appliances 20 in a situation where the user U is performing actions in an environment in which a plurality of home appliances 20 having sensor levels of any of Level 1 to Level 3 are installed.

In FIG. 2, in the space inside a kitchen K of the user's home, the electric kettle 20-3 and the ventilation fan 20-4 having a sensor level of Level 1, the microwave oven 20-2 and the stove 20-5 having a sensor level of Level 2, and the refrigerator 20-1 having a sensor level of Level 3 are installed. In the space inside the kitchen K, the user U is performing various actions.

At this time, when outputting information such as sound or a message to the user U in the kitchen K, it is preferable that various types of information are output from the home appliance 20 installed at the position closest to the user U. In this case, the position of the user in the kitchen K can be estimated by, for example, the following processing.

First, in the device control system 1, the control device 10 recognizes the relative positional relationship of the respective home appliance 20 in advance by calibration.

As a method of recognizing this relative positional relationship, for example, the relative positional relationship can be recognized by performing wireless communication using Bluetooth (registered trademark), a beacon, or the like, using a detection mechanism such as a camera or an IR LED, performing object detection using a depth camera or a stereo camera, or performing distance measurement using RFID tags or ultrasonic waves.

Next, the control device 10 first checks whether the user U can be detected by the refrigerator 20-1 having a sensor level of Level 3.

At this time, in the refrigerator 20-1, the user U or the like who is using the refrigerator is detected by the motion sensor. When the user U is detected by the refrigerator 20-1, the control device 10 specifies the refrigerator 20-1 as an output target device, and performs control so that information such as sound or a message is output from the refrigerator 20-1.

On the other hand, when the refrigerator 20-1 having the sensor level of Level 3 cannot detect the user U, the control device 10 then checks whether the home appliance 20 having the sensor level of Level 1 or Level 2 can detect the user U.

That is, the control device 10 regards a range (range of unit distance r×elapsed time t) corresponding to the sensor level (Level 1, 2) of the home appliance 20 around the position of the home appliance 20 that last detected the user U as a range in which the user U (the user U who has moved after operating the home appliance 20 that last detected the user U) is assumed to be present and specifies all the home appliances 20 installed in the range the output target device. The control device 10 performs control so that information such as sound and messages is output from the specified output target home appliance 20.

In other words, it can be said that the sensor level is defined by the sampling rate at which the user is detected, that is, how far the user can be guaranteed to be from the home appliance 20 as the time resolution.

Figure 3:
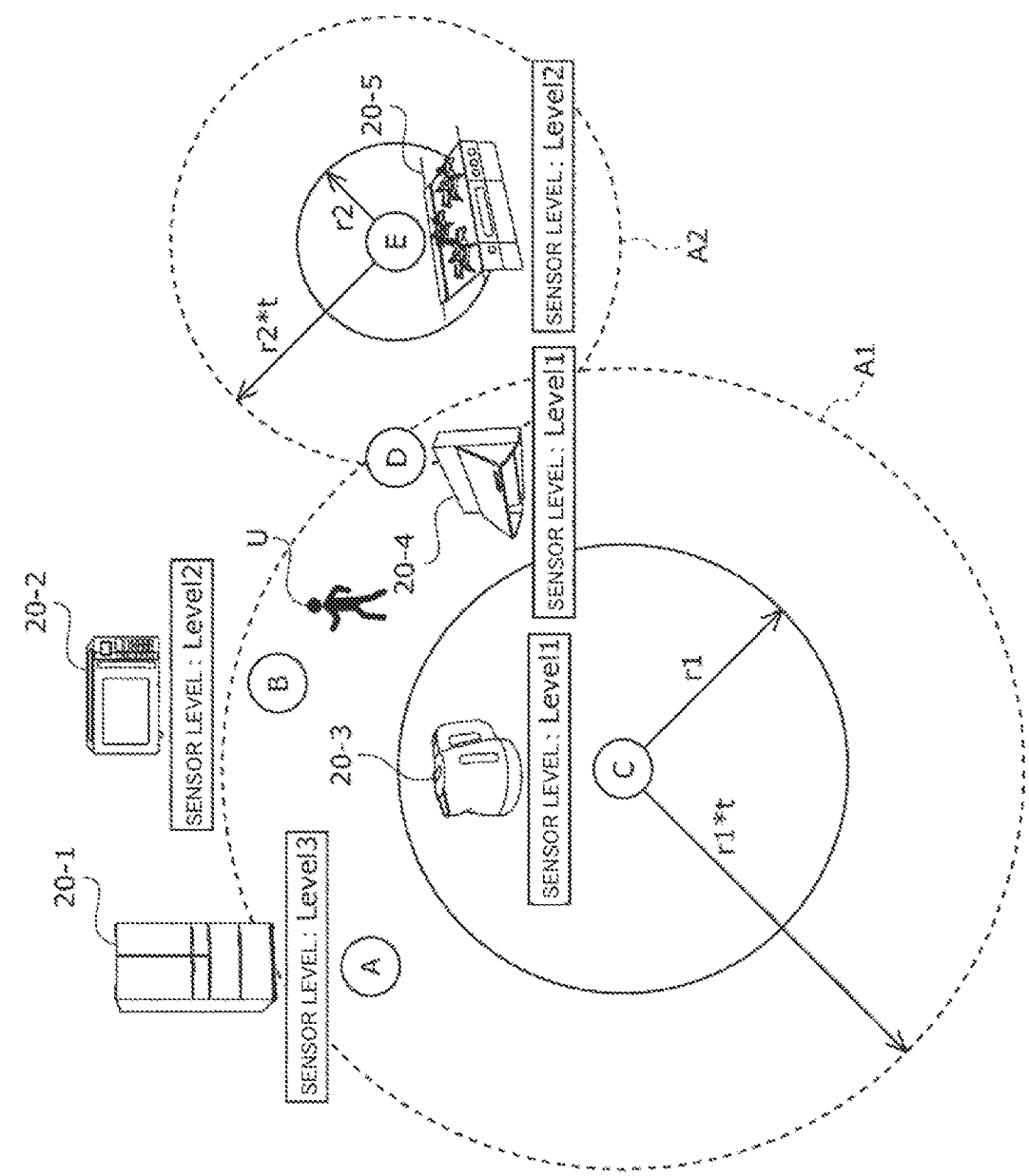
FIG. 3 is a diagram showing an example of user position estimation by each home appliance.

FIG. 3 shows an example of the position estimation of the user U by each home appliance 20 in the kitchen K. FIG. 3 shows a view of the space of the kitchen K from directly above.

In FIG. 3, the refrigerator 20-1 having the sensor level of Level 3 is installed at the position of "A", the microwave oven 20-2 and the stove 20-5 having the sensor level of Level 2 are installed at the positions of "B" and "E", respectively, and the electric kettle 20-3 and the ventilation fan 20-4 having the sensor level of Level 3 are installed at the positions of "C" and "D", respectively.

Since the refrigerator 20-1 has a sensor level of Level 3, it is possible to immediately detect that the user U is present in front.

Since the stove 20-5 has a sensor level of Level 2, it may have been operated by the user U within a certain period of time.

For example, assuming that time t has elapsed since the previous operation on the stove 20-5 was performed, the radius of a circle around the position E is set as a unit distance r2, and all home appliances 20 included in the range of the circle (the area A2 of the circle indicated by the broken line in the figure) whose radius is multiplied by t are specified as the output target devices. Specifically, the ventilation fan 20-4 as well as the stove 20-5 is specified as the output target device, and information is output from both devices.

Since the electric kettle 20-3 has a sensor level of Level 1, the frequency of operations such as power operation is lower than that of the home appliance 20 having a sensor level of Level 2. Therefore, the unit distance r1 of the electric kettle 20-3 is longer than the unit distance r2 of the stove 20-5.

For example, assuming that time t has elapsed since the previous operation on the electric kettle 20-3 was performed, the radius of the circle around the position C is set as the unit distance r1, and all home appliances 20 included in the range of the circle (the area A1 indicated by the broken line in the figure) whose radius is multiplied by t are specified as the output target devices. Specifically, the microwave oven 20-2 and the ventilation fan 20-4 as well as the electric kettle 20-3 are specified as output target devices, and information is output from these devices.

Although not shown, a unit distance r2 corresponding to the sensor level of Level 2 is set to the microwave oven 20-2 and a unit distance r1 corresponding to the sensor level of Level 1 is set to the ventilation fan 20-4.

Here, the reason why the unit distance r multiplied by the elapsed time t from the time when the last operation was performed by the user U is not simply set to the common unit distance is as follows.

That is, since the operation frequency of the user U is different between the sensor levels of Level 1 and Level 2, the probability that the user will stay in place is different depending on whether the user operates once and then leaves or the next operation is required within a few minutes, and the individual unit distances are set.

For example, as an example of "case where the user operates once and then leaves" for the sensor level of Level 1, there is a case where the user may leave the place for 1 hour or more after setting dishes in a dishwasher (not shown). Also, for example, as an example of "case where the next operation is required within a few minutes" for the sensor level of Level 2, there is a case where the user sets food in the microwave oven 20-2, and checks and reheats the food when the time is up.

When the multiplication result of r1×t, r2×t, or the like exceeds a predetermined threshold d, the control device 10 determines that the user U is not already in the kitchen K, and performs control so that the output of information from all home appliances 20 in the kitchen K is stopped. In this way, when the user U moves outside a meaningful space such as the kitchen K (when the user leaves the room), the output of information is stopped at the same time.

At this time, the control device 10 may send a message indicating that the user is not in the kitchen K to the device requesting the output of the information to provide feedback.

As described above, in the device control system 1, even if the home appliance 20 does not have a motion sensor, the home appliance 20 that is assumed to be closest to the user's position is specified according to the usage status of the user, and information is output to the home appliance 20.

At that time, by defining the sensor level corresponding to the detection resolution by the type of the sensor included in each home appliance 20, the control device 10 can specify the output target home appliance 20 based on the sensor level. The control device 10 may estimate the current position of the user in consideration of the fact that the user moves from the final detection state of the user, and may specify the output target home appliance 20 based on the estimation result.

In other words, the sensor level includes a first level including a sensor (for example, a motion sensor) that can directly detect the user's position and a second level including a sensor (for example, a sensor capable of detecting the user's operation) that can indirectly detect the user's position. The second level can be divided into a plurality of stages according to the operation frequency of the user.

For example, in the case of the sensor level including the above-mentioned three stages of levels of Level 1 to Level 3, Level 3 corresponds to the first level, and Level 1 and Level 2 correspond to the second level. That is, Level 1 and Level 2 correspond to two stages corresponding to the operation frequency of the user.

Figure 4:
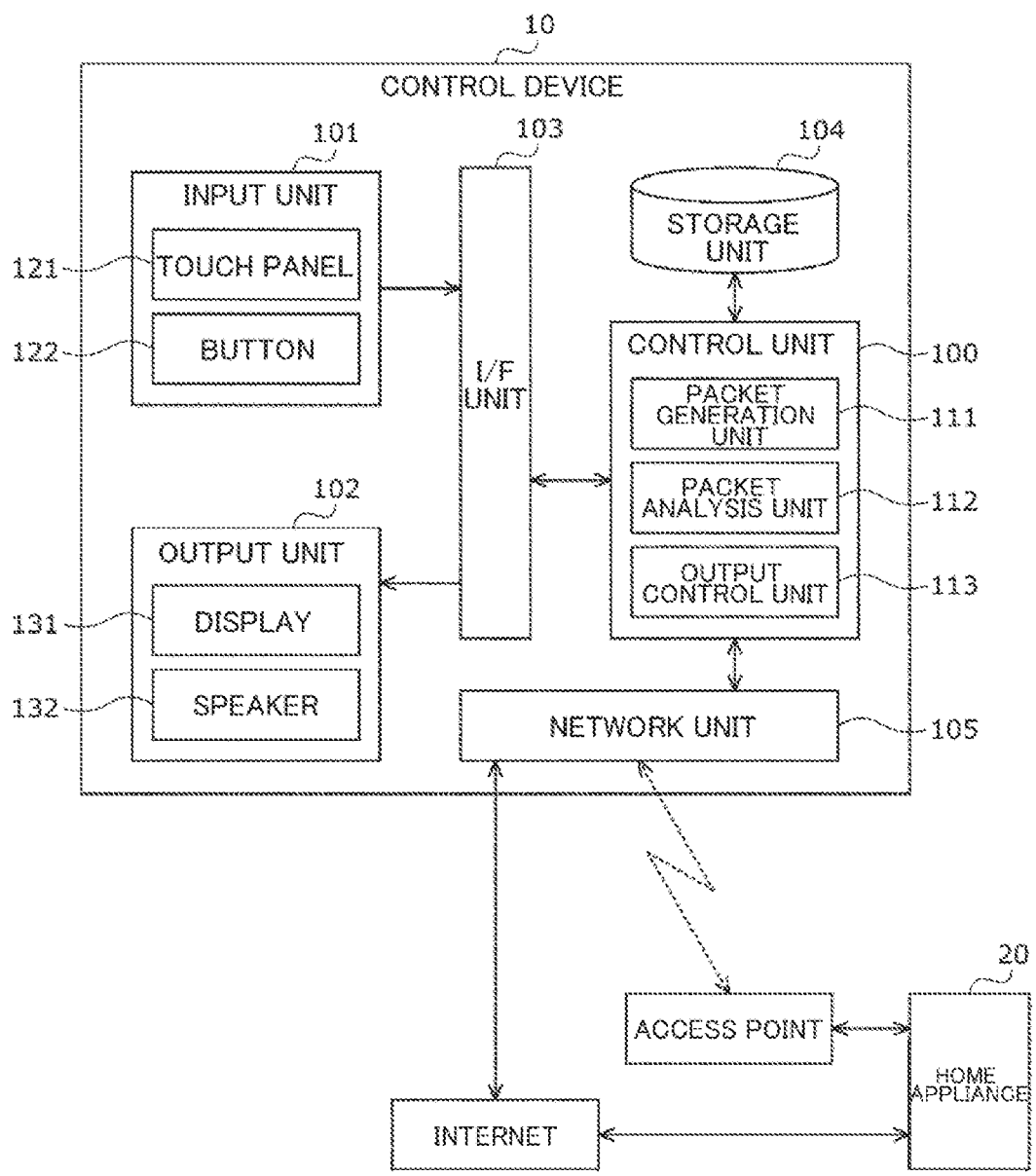
FIG. 4 is a block diagram showing an example of a configuration of a control device.
Figure 5:
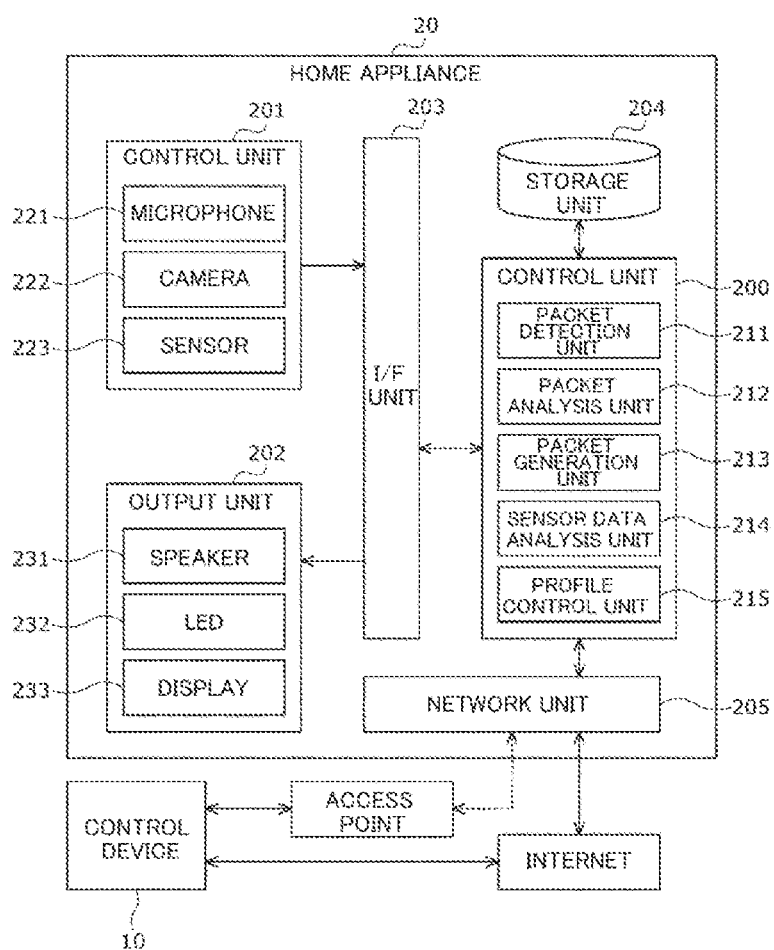
FIG. 5 is a block diagram showing an example of a configuration of a home appliance.

An example of the configuration of the device control system 1 for realizing the above-described processing is shown in FIGS. 4 and 5. In this example, a configuration is shown in which the control device 10 for integrally controlling the home appliances 20 connected to the network 30, but an arbitrary home appliance 20 may have the function of the control device 10, and the control device 10 may not be provided.

(Configuration Example of Control Device)

FIG. 4 is a block diagram showing an example of the configuration of the control device 10 of FIG. 1.

In FIG. 4, the control device 10 has a control unit 100, an input unit 101, an output unit 102, an I/F unit 103, a storage unit 104, and a network unit 105.

The control unit 100 is a central control device (processing device) that controls the operation of each unit and performs various types of arithmetic processes. The control unit 100 includes a processor such as a CPU (Central Processing Unit).

The control unit 100 includes a packet generation unit 111, a packet analysis unit 112, and an output control unit 113.

The packet generation unit 111 generates various packets. The packet generated by the packet generation unit 111 includes, for example, a packet as a trigger signal or a tracking signal. The details of the trigger signal will be described later with reference to FIGS. 10 and 11. The details of the tracking signal will be described later with reference to FIG. 17 and the like.

The packet analysis unit 112 analyzes various packets. The packet analyzed by the packet analysis unit 112 includes, for example, a packet as a reply signal transmitted from the home appliance 20. The details of the reply signal will be described later with reference to FIGS. 12 to 15.

The output control unit 113 controls each unit such as the network unit 105 so that various types of information are output from the home appliance 20 specified as the output target device.

The input unit 101 is operated by the user, and the operation signal corresponding to the operation is supplied to the control unit 100 via the I/F unit 103. For example, the input unit 101 has a touch panel 121 and a button 122.

When the user's finger contacts (touches) the surface of the display, the touch panel 121 supplies an operation signal corresponding to the contact position (position of a predetermined point) to the control unit 100. The button 122 is provided at a predetermined position, and when pressed by the user, an operation signal corresponding to the operation is supplied to the control unit 100.

The output unit 102 outputs various types of information according to the control from the control unit 100 via the I/F unit 103. For example, the output unit 102 has a display 131 and a speaker 132.

The display 131 displays an image according to the control from the control unit 100. The speaker 132 outputs sound according to the control from the control unit 100. The display 131 is configured of a liquid crystal panel, an OLED (Organic Light Emitting Diode) panel, and the like.

The I/F unit 103 is an interface for inputting/outputting signals (data) to/from the control unit 100, the input unit 101, and the output unit 102.

The storage unit 104 records various types of data according to the control from the control unit 100. The control unit 100 reads and processes various types of data recorded in the storage unit 104.

The storage unit 104 is configured of an auxiliary storage device such as a semiconductor memory or an HDD (Hard Disk Drive). The storage unit 104 may be configured as an internal storage or may be an external storage such as a memory card.

The network unit 105 performs communication according to a predetermined communication method. For example, the network unit 105 transmits a control signal according to the control from the control unit 100. The network unit 105 receives the signal transmitted from the home appliance 20 and supplies it to the control unit 100.

In the present embodiment, the communication is, for example, wireless LAN (Local Area Network) via an access point, mobile communication such as 4G or 5G, and TCP/IP (Transmission Control Protocol/Internet Protocol) via the Internet.

(Configuration Example of Home Appliance)

FIG. 5 is a block diagram showing an example of the configuration of the home appliance 20 of FIG. 1.

In FIG. 5, the home appliance 20 has a control unit 200, an input unit 201, an output unit 202, an I/F unit 203, a storage unit 204, and a network unit 205.

The control unit 200 is a central control device (processing device) that controls the operation of each unit and performs various types of arithmetic processes. The control unit 200 is configured of a processor such as a CPU.

The control unit 200 includes a packet detection unit 211, a packet analysis unit 212, a packet generation unit 213, a sensor data analysis unit 214, and a profile control unit 215.

The packet detection unit 211 detects various packets. The packet detected by the packet detection unit 211 includes, for example, a packet as a trigger signal or a tracking signal transmitted from the control device 10. The details of the trigger signal will be described later with reference to FIGS. 10 and 11. The details of the tracking signal will be described later with reference to FIG. 17 and the like.

The packet analysis unit 212 analyzes various packets. The packet analyzed by the packet analysis unit 212 includes, for example, a packet as a trigger signal or a tracking signal transmitted from the control device 10.

The packet generation unit 213 generates various packets. The packet generated by the packet generation unit 213 includes, for example, a packet as a reply signal. The details of the reply signal will be described later with reference to FIGS. 12 to 15.

The sensor data analysis unit 214 analyzes the sensor data supplied from the sensor 223 as needed. The profile control unit 215 controls reading and writing of the profile from/to the storage unit 204, as necessary. This profile includes information about an input device, an output device, and the like included in the home appliance 20.

The input unit 201 has one or more (types of) input devices that accept inputs of physical quantities. The data (sensor data) output by the input device included in the input unit 201 is supplied to the control unit 200 via the I/F unit 203.

For example, the input unit 201 has a microphone 221, a camera 222, and a sensor 223 as input devices. The electric signal output by the input device included in the input unit 201 is also referred to as sensor data.

The microphone 221 receives (senses) sound as a vibration of air and outputs sound as an electric signal. The camera 222 has an image sensor, a signal processing unit, and the like. The camera 222 receives (senses) light, performs photoelectric conversion, and outputs it as an electric signal.

The sensor 223 senses spatial information, time information, and the like, and outputs an electric signal corresponding to the sensing result. The sensor 223 includes various types of sensors such as a motion sensor and a sensor capable of detecting a user's operation.

For example, when the home appliance 20 has a sensor level of Level 3, the sensor 223 includes at least a motion sensor. Further, for example, when the home appliance 20 has a sensor level of Level 1 or Level 2, it includes at least a sensor capable of detecting a user's operation.

The output unit 202 has one or more output devices that output physical quantities. The output unit 202 outputs various types of information according to the control from the control unit 200 via the I/F unit 203.

For example, the output unit 202 has a speaker 231, an LED 232, and a display 233.

The speaker 231 outputs sound according to the control from the control unit 200. The LED 232 outputs (emits) light according to the control from the control unit 200. The display 233 is configured of a liquid crystal panel or the like, and displays an image according to the control from the control unit 200.

The I/F unit 203 is an interface for inputting/outputting signals (data) to/from the control unit 200, the input unit 201, and the output unit 202.

The storage unit 204 records various types of data according to the control from the control unit 200. The control unit 200 reads and processes various types of data recorded in the storage unit 204.

The storage unit 204 is an auxiliary storage device such as a semiconductor memory, and is configured as an internal storage or an external storage.

The network unit 205 performs communication according to a predetermined communication method. For example, the network unit 205 transmits a signal according to the control from the control unit 200. The network unit 205 receives the signal transmitted from the control device 10 and supplies it to the control unit 200.

Next, with reference to FIGS. 6 to 9, the overall processing flow of the device control system 1 will be described. For example, in a case where a notification or music playback is performed remotely from a device such as a smartphone connected to the control device 10, or the control device 10 such as a smartphone, the processing of the control device 10 and the home appliance 20 is executed when information such as a message or sound is output from the home appliance 20 installed at the position closest to the user.

(Processing Example of Control Device)

Figure 6:
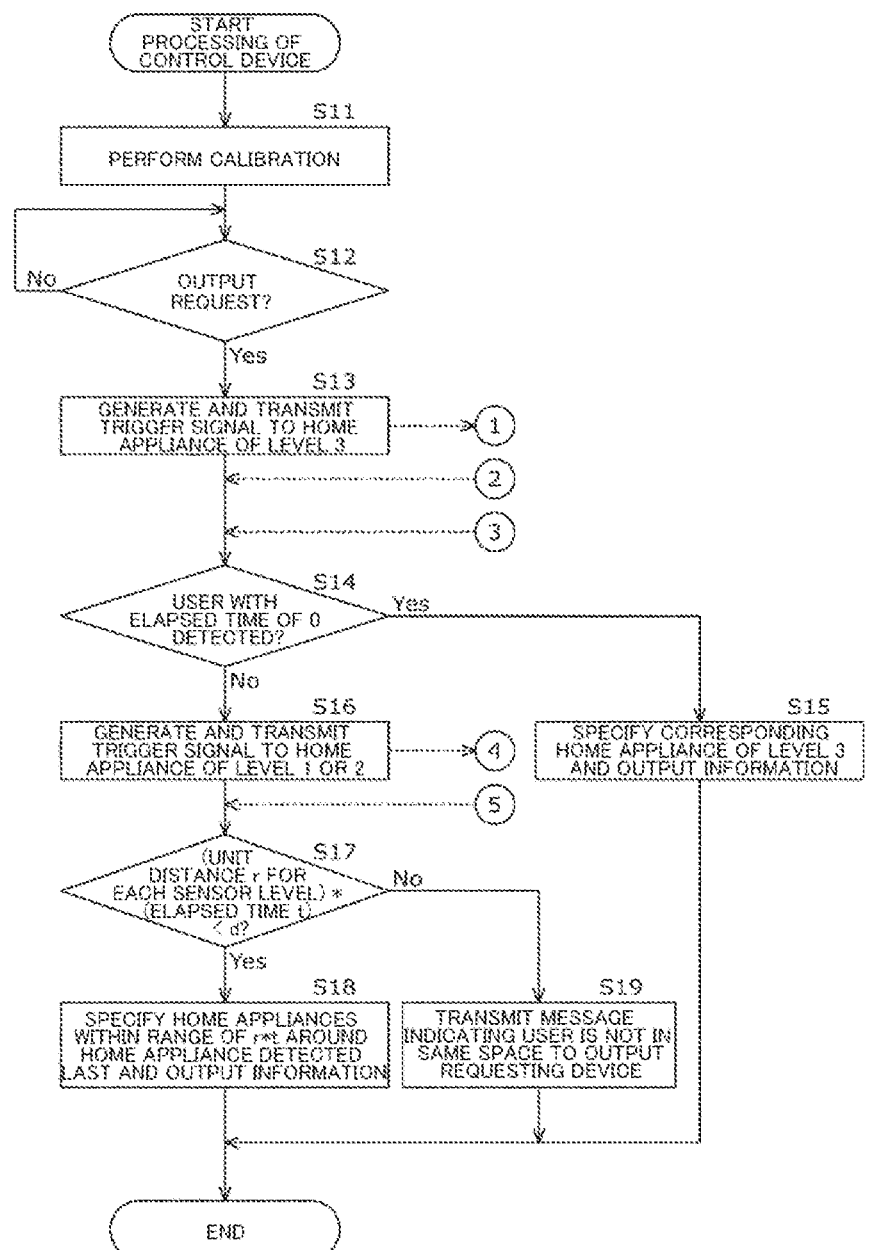
FIG. 6 is a flowchart illustrating an example of processing of a control device.

FIG. 6 is a flowchart illustrating an example of processing of the control device 10.

In the control device 10, calibration is performed at a predetermined timing such as when the device is installed (S11).

In this calibration, the relative positional relationship of the home appliances 20 is recognized using a recognition method such as wireless communication or distance measurement. At this time, the control device 10 may collect profiles relating to the presence/absence of output devices (speakers 231, LED 232, display 233, and the like) of each home appliance 20, generate a profile list, and record it in the storage unit 204.

In step S12, the control unit 100 determines whether there is an output request from a device or the like connected to the control device 10.

If it is determined in the determination process of step S12 that there is an output request, the process proceeds to step S13.

In step S13, the packet generation unit 111 generates a trigger signal for the home appliance 20 having a sensor level of Level 3.

In step S13, the network unit 105 broadcasts the generated trigger signal via the network 30 according to the control from the control unit 100.

That is, here, first, the trigger signal is used to check the home appliance 20 having the sensor level of Level 3. The details of the trigger signal will be described later with reference to FIGS. 10 and 11.

A reply signal is transmitted from the home appliance 20 having a sensor level of Level 3 that has received this trigger signal via the network 30, and is received by the network unit 105.

This reply signal includes information on the sensor level (hereinafter referred to as sensor level information), information on the detection status of the user using the sensor (hereinafter referred to as user detection status information), and information on the elapsed time t since the user was detected last (hereinafter referred to as elapsed time information). Based on these pieces information, the control device 10 can share the user detection status of each home appliance 20 via the network 30. The details of the reply signal will be described later with reference to FIGS. 12 to 15.

In step S14, the packet analysis unit 112 determines whether the user has been detected at an elapsed time t of 0 sec based on information such as the user detection status information and the elapsed time information included in the received reply signal.

If it is determined in the determination process of step S14 that the user has been detected at an elapsed time t of 0 sec, the process proceeds to step S15.

In step S15, the packet analysis unit 112 specifies, as an output target device, the home appliance 20 having the corresponding sensor level of Level 3, in which the user has been detected at the elapsed time t of 0 sec, that is, the user who is within the detection range has been detected by the motion sensor.

In step S15, the output control unit 113 controls each unit such as the network unit 105 so that information such as a message or sound from a device connected to the control device 10 or the server on the Internet is output from the home appliance 20 specified as the output target device.

In this way, for example, since it is assumed that the user is in the vicinity of the specified refrigerator 20-1, the refrigerator 20-1 starts outputting information such as a message and sound.

On the other hand, if it is determined in the determination process of step S14 that no user has been detected at the elapsed time t of 0 sec, the process proceeds to step S16 because the home appliance 20 having the sensor level of Level 3 does not exist.

In step S16, the packet generation unit 111 generates a trigger signal for the home appliance 20 having the sensor level of Level 1 or 2.

In step S16, the network unit 105 broadcasts the generated trigger signal via the network 30 according to the control from the control unit 100.

That is, when the trigger signal is transmitted to the home appliance 20 having the sensor level of Level 3 (S13), but the user cannot be detected by the motion sensor in the home appliance 20, or the user has been detected at the elapsed time t of 0 sec or more, the trigger signal is used to check the home appliance 20 having the sensor level of Level 1 or 2. The details of the trigger signal will be described later with reference to FIGS. 10 and 11.

A reply signal is transmitted from the home appliance 20 having the sensor level of Level 1 or 2 that has received this trigger signal via the network 30, and is received by the network unit 105.

Details will be described with reference to FIGS. 12 to 15, but the reply signal includes information such as sensor level information, user detection status information, and elapsed time information. Based on these pieces information, the control device 10 can share the user detection status of each home appliance 20 via the network 30.

In step S17, the packet analysis unit 112 determines whether a multiplication result (calculation result) of (unit distance r for each sensor level)×(elapsed time t) is less than the threshold d based on information such as the sensor level information and the elapsed time information included in the received reply signal.

If it is determined in the determination process of step S17 that the multiplication result is less than the threshold d, the process proceeds to step S18.

In step S18, the packet analysis unit 112 specifies all the home appliances 20 within the range of (unit distance r for each sensor level)×(elapsed time t), around the position of the home appliance 20 that last detected the user as the output target devices.

That is, the packet analysis unit 112 compares all the reply signals including the reply signals from the home appliances 20 having the sensor levels of Level 1 and 2 and the reply signal (reply signal including the elapsed time information) from the home appliance 20 having the sensor level of Level 3 and estimates that the home appliance 20 in which the shortest elapsed time t is measured is the device that the user has operated the last.

When the multiplication result of the estimated elapsed time t in the home appliance 20 and the unit distance r of the sensor level of the home appliance 20 is less than the threshold d, the packet analysis unit 112 estimates that the user is still in the space.

In step S18, the output control unit 113 controls each unit such as the network unit 105, so that information such as a message or sound from a device connected to the control device 10 or the server on the Internet is output from all home appliances 20 specified as the output target devices.

In this way, for example, as shown in FIG. 3, the stove 20-5 and the ventilation fan 20-4 within the range of (unit distance r2 of Level 2)×(elapsed time t) or the electric kettle 20-3, the refrigerator 20-1, the microwave oven 20-2, and the ventilation fan 20-4 within the range of (unit distance r1 of Level 1)×(elapsed time t) start outputting information such as a message or sound.

On the other hand, if it is determined in the determination process of step S17 that the multiplication result exceeds the threshold d, the process proceeds to step S19.

In step S19, since it is estimated that a user has left the space after a sufficient time has elapsed since the last operation, the packet generation unit 111 generates a packet as a message indicating that the user is not in the same space.

In step S19, the network unit 105 transmits the generated message (packet including the same) to the output requesting device such as the device connected to the control device 10 according to the control from the control unit 100.

When the processing of steps S15, S18, or S19 ends, the processing of the control device 10 ends.

When the output target home appliance 20 is specified in the process of step S15 or S18, the profile list stored in the storage unit 204 may be read at the time of calibration, the presence/absence of the output device of the output target home appliance 20 may be checked, and then, the output target home appliance 20 may be specified.

Specifically, in the case of outputting sound, the home appliance 20 having the speaker 231 as an output device may be specified as an output target. When outputting a still image or a moving image, the home appliance 20 having the display 233 as an output device may be specified as an output target.

In the process of step S13 or S16, the case where the trigger signal is transmitted by broadcast via the network 30 and only the home appliance 20 having the corresponding sensor level operates is shown. For example, when the sensor level of the home appliance 20 connected to the network 30 is grasped in advance on the control device 10 side, the trigger signal can be transmitted to the home appliance 20 having a specific sensor level.

The processing flow of the control device 10 has been described above.

(Processing Example of Home Appliance of Level 3)

Figure 7:
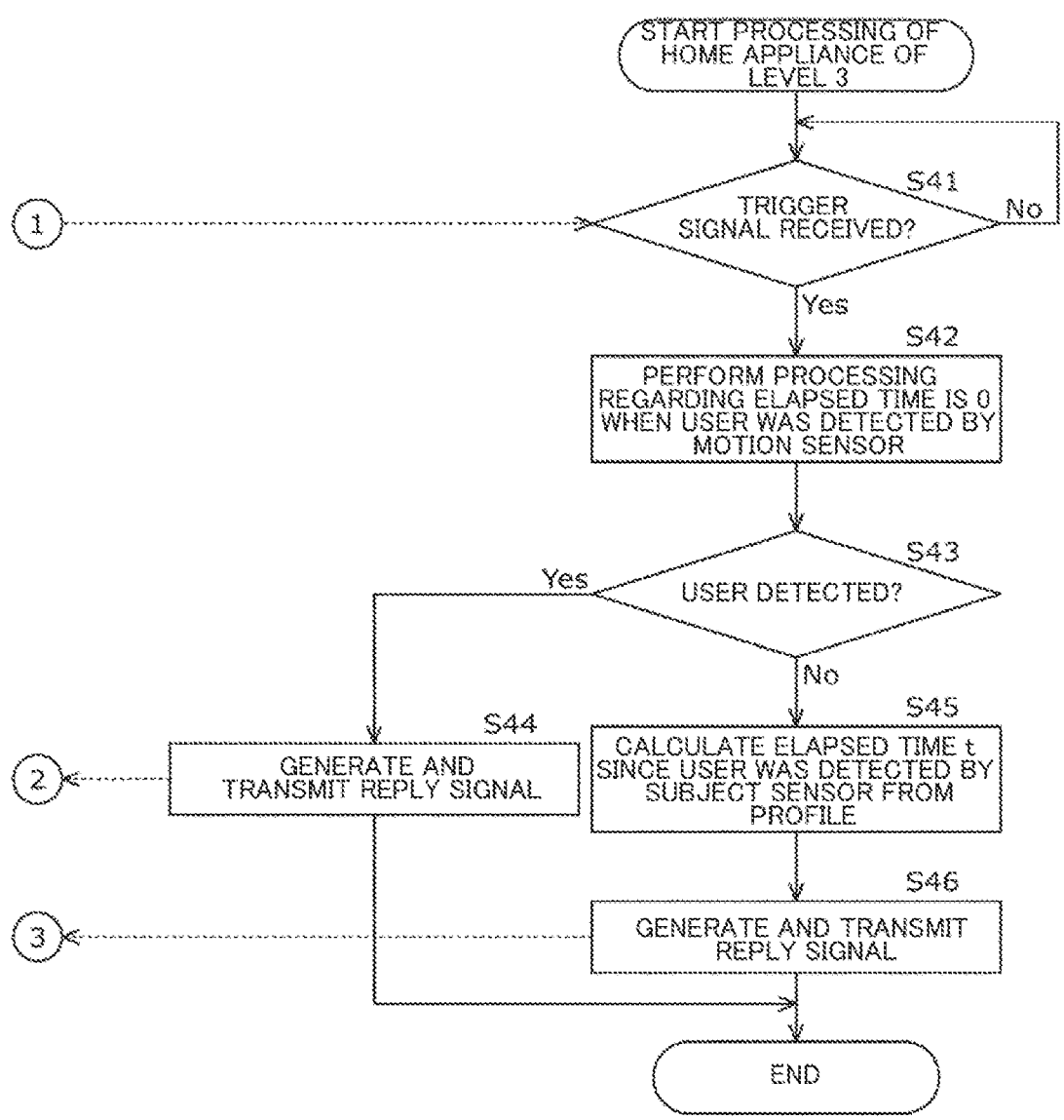
FIG. 7 is a flowchart illustrating an example of processing of a home appliance of Level 3.

FIG. 7 is a flowchart illustrating an example of processing of the home appliance 20 having a sensor level of Level 3.

In step S41, the packet detection unit 211 determines whether the trigger signal transmitted from the control device 10 via the network 30 has been received. This trigger signal is transmitted in the process of step S13 of FIG. 6.

If it is determined in the determination process of step S41 that the trigger signal has been received, the process proceeds to step S42.

In step S42, the sensor data analysis unit 214 analyzes the sensor data from the sensor 223, and if the user who exists within the detection range can be detected by the motion sensor, performs processing regarding the elapsed time t as 0 sec because it is real-time detection.

In step S43, the sensor data analysis unit 214 determines whether the user has been detected by the motion sensor.

If it is determined in the determination process of step S43 that the user has been detected by the motion sensor, the process proceeds to step S44.

In step S44, the packet generation unit 213 generates a reply signal including information such as sensor level information, user detection status information, and elapsed time information, based on the analysis result and the like from the sensor data analysis unit 214.

In step S44, the network unit 205 transmits the generated reply signal to the control device 10 via the network 30 according to the control from the control unit 200.

Details will be described with reference to FIGS. 12 to 15, but at this time, the sensor level information includes a value indicating "Level 3", the user detection status information includes a value indicating that the user has been detected and the elapsed time information includes a value indicating 0 sec.

On the other hand, if it is determined in the determination process of step S43 that the user has not been detected by the motion sensor, the process proceeds to step S45.

In step S45, the sensor data analysis unit 214 calculates the elapsed time t since the user was detected the latest based on the sensor data from the sensor 223 having the sensor level of Level 1 or Level 2 by referring to the profile held therein.

In step S46, the packet generation unit 213 generates a reply signal including information such as elapsed time information based on the analysis result and the like from the sensor data analysis unit 214. The elapsed time information includes a value corresponding to the elapsed time t calculated in the process of step S45.

In step S46, the network unit 205 transmits the generated reply signal to the control device 10 via the network 30 according to the control from the control unit 200. The details of the reply signal will be described later with reference to FIGS. 12 to 15.

FIG. 8 shows an example of sensor data detected by a sensor other than the motion sensor in the home appliance 20.

Refrigerators can detect operations such as opening and closing the door with the aid of a sensor. Microwave ovens can detect operations such as opening and closing doors, changing settings, and starting reheating a meal with the aid of a sensor. Electric kettles can detect operations such as power operation and temperature adjustment with the aid of a sensor.

Ventilation fans can detect operations such as power operation and wind power setting with the aid of a sensor. Stoves can detect operations such as power operation and thermal power adjustment with the aid of a sensor. Rice cookers can detect operations such as opening and closing the lid and changing the rice cooking setting with the aid of a sensor.

For example, in the refrigerator 20-1 having a sensor level of Level 3, when the user cannot be detected by the motion sensor, the door opening/closing operation is detected by the sensor to calculate the elapsed time t since the latest door opening/closing operation by the user was detected.

When the processing of step S44 or S46 ends, the processing of the home appliance 20 ends. The reply signal transmitted in the process of step S44 or S46 is received before the control device 10 performs the process of step S14 of FIG. 6.

The processing flow of the home appliance 20 having the sensor level of Level 3 has been described above.

(Processing Example of Home Appliance of Level 1 or 2)

Figure 9:
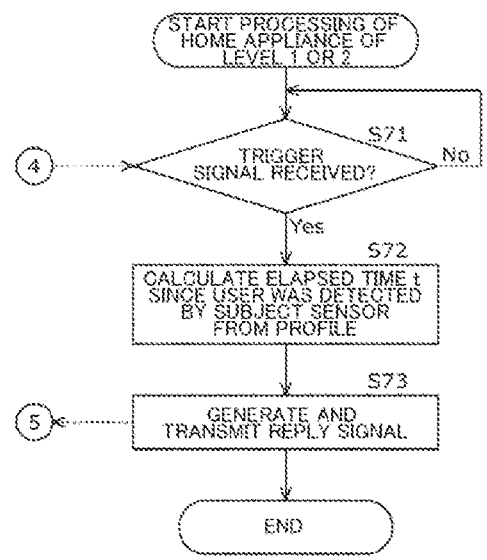
FIG. 9 is a flowchart illustrating an example of processing of home appliances of Level 1 and 2.

FIG. 9 is a flowchart illustrating an example of processing of the home appliance 20 having the sensor level of Level 1 or 2.

In step S71, the packet detection unit 211 determines whether the trigger signal transmitted from the control device 10 via the network 30 has been received. This trigger signal is transmitted in the process of step S16 of FIG. 6.

If it is determined in the determination process of step S71 that the trigger signal has been received, the process proceeds to step S72.

In step S72, the sensor data analysis unit 214 calculates the elapsed time t since the user was detected the latest based on the sensor data from the sensor 223 by referring to the profile held therein.

In step S73, the packet generation unit 213 generates a reply signal including information such as elapsed time information based on the analysis result and the like from the sensor data analysis unit 214. The elapsed time information includes a value corresponding to the elapsed time t calculated in the process of step S72.

In step S73, the network unit 205 transmits the generated reply signal to the control device 10 via the network 30 according to the control from the control unit 200. The details of the reply signal will be described later with reference to FIGS. 12 to 15.

When the process of step S73 ends, the process of the home appliance 20 ends. The reply signal transmitted in the process of step S73 is received before the control device 10 performs the process of step S17 of FIG. 6.

The processing flow of the home appliance 20 having the sensor level of Level 1 and 2 has been described above.

(Configuration Example of Trigger Signal)

FIG. 10 shows an example of the format of a packet as a trigger signal.

In FIG. 10, in the packet as a trigger signal, an 8-bit Operation Code, an 8-bit Optional, and a 48-bit MAC Address are arranged in that order from the beginning.

An identifier for each processing category is described in the Operation Code. FIG. 11 shows an example of Operation Code. In the case of a trigger signal (trigger packet) that is a communication request from the control device 10, "TRIGGER" represented by "0000 0011" is described.

Note that "QUERY" is described in the case of a packet transmitted from the control device 10 in order to recognize all devices connected to the network 30. "NOTIFY" is described in the case of a packet notifying the device connected to the network 30 of the fact that the subject device is connected.

Using the two codes "QUERY" and "NOTIFY", it is possible to obtain a list of devices connected to the network 30 in advance even before the trigger signal is transmitted/received. Further, "ACK" and "NAK" are described in the case of a reply packet for the sent packet of each Operation Code.

Optional information is described in Optional. For example, Optional may include sensor level information about the sensor level. In MAC Address, the MAC address of the subject (source) device is described.

In the process of the control device 10 shown in FIG. 6 described above, the trigger signal is generated in the process of steps S13 and S16, and for example, the following packet is generated.

That is, in the packet as the trigger signal generated in the process of step S13, "3" indicating "TRIGGER" is set in Operation Code, and "3" indicating "Level 3" is set in Optional. In this way, the control device 10 generates a trigger signal represented by a bit string of "0000 0011 0000 0011 xxxx . . . (MAC Address)".

In the case of a packet as a trigger signal generated in the process of step S16, a value indicating "Level 1" or "Level 2" is set in Optional.

(Configuration Example of Reply Signal)

FIG. 12 shows an example of the format of a packet as a reply signal.

In FIG. 12, the packet as a reply signal has an 8-bit Operation Code, an 8-bit Reserved, a 48-bit MAC Address, a 3-bit Sensor Level, a 1-bit Detect, and a 12-bit Elapse Time are arranged in that order from the beginning.

Since the reply signal is a reply packet for the packet as the trigger signal, "ACK" shown in FIG. 11 is described in the Operation Code.

Figure 13:
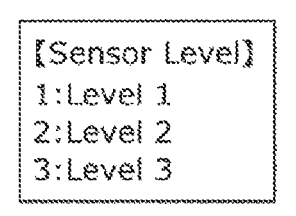

In Sensor Level, sensor level information regarding the sensor level for each home appliance 20 that has received the trigger signal is described. FIG. 13 shows an example of Sensor Level. In this example, since three stages of levels are used as the sensor level, one of "Level 1" ("1"), "Level 2" ("2"), and "Level 3" ("3") is described.

Figure 14:
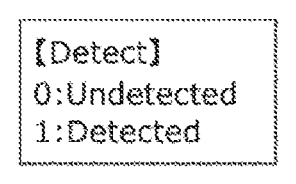

User detection status information regarding the detection status of the user is described in Detect. FIG. 14 shows an example of Detect. As Detect, two values corresponding to the detection status are described, that is, "Detected" ("1") is described when the user can be detected, while "Undetected" ("0") is described when the user cannot be detected.

Figure 15:
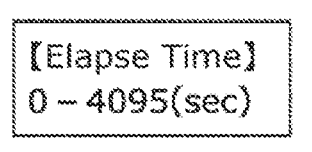

Elapse Time describes the elapsed time information regarding the elapsed time. FIG. 15 shows an example of Elapse Time. As Elapse Time, the elapsed time t since the user was detected the last is set to a value in the range of 0 sec to 4095 sec.

In the processing of the home appliance 20 shown in FIGS. 7 and 9 described above, a reply signal is generated in the processing of steps S44 and S46 of FIG. 7 and the processing of step S73 of FIG. 9, and, for example, the following packet is generated.

That is, in the packet as the reply signal generated in the process of step S44, "4" indicating "ACK" is set in the Operation Code, "3" indicating "Level 3" is set in the Sensor Level, "1" indicating "Detected" is set in the Detect, and "0" indicating the elapsed time t is set in the Elapse Time. In this way, in the home appliance 20 having the sensor level of Level 3, a reply signal represented by a bit string of "0000 0100 0000 0000 xxxx . . . (MAC Address) 0111 0000 0000" is generated.

In the case of a packet as a reply signal generated in the processes of steps S46 and S73, a value indicating "Level 1" or "Level 2" is set in the Sensor Level, "0" indicating "Undetected" is set in the Detect, and a value corresponding to the elapsed time t is set in the Elapsed Time.

As described above, in the device control system 1, the control device 10 transmits a trigger signal to the home appliance 20 via the network 30, and specifies the output target home appliance 20 for outputting information based on the reply signal transmitted from the home appliance 20 that has received the trigger signal.

2. Modified Example (Support for Non-Compatible Devices)

By the way, in the device control system 1, there may be a mixed environment with home appliances (non-compatible devices) that do not have a network connection function such as conventional white goods. In such a mixed environment, there is a method of installing a monitoring device having a sensor such as a thermal camera or an RGB camera in a space (room) such as a kitchen.

According to the thermo camera, for example, the presence of a non-compatible device can be estimated from the heat generated by the power source of the non-compatible device and the heat of the heat source of the non-compatible device for cooking. For the RGB camera, for example, the captured image captured by the RGB camera is matched with the standard pattern using a database that stores the standard pattern used for image recognition, and the non-compatible device as the subject photographed in the captured image is recognized. By doing so, the presence of a non-compliant device can be estimated.

Figure 16:
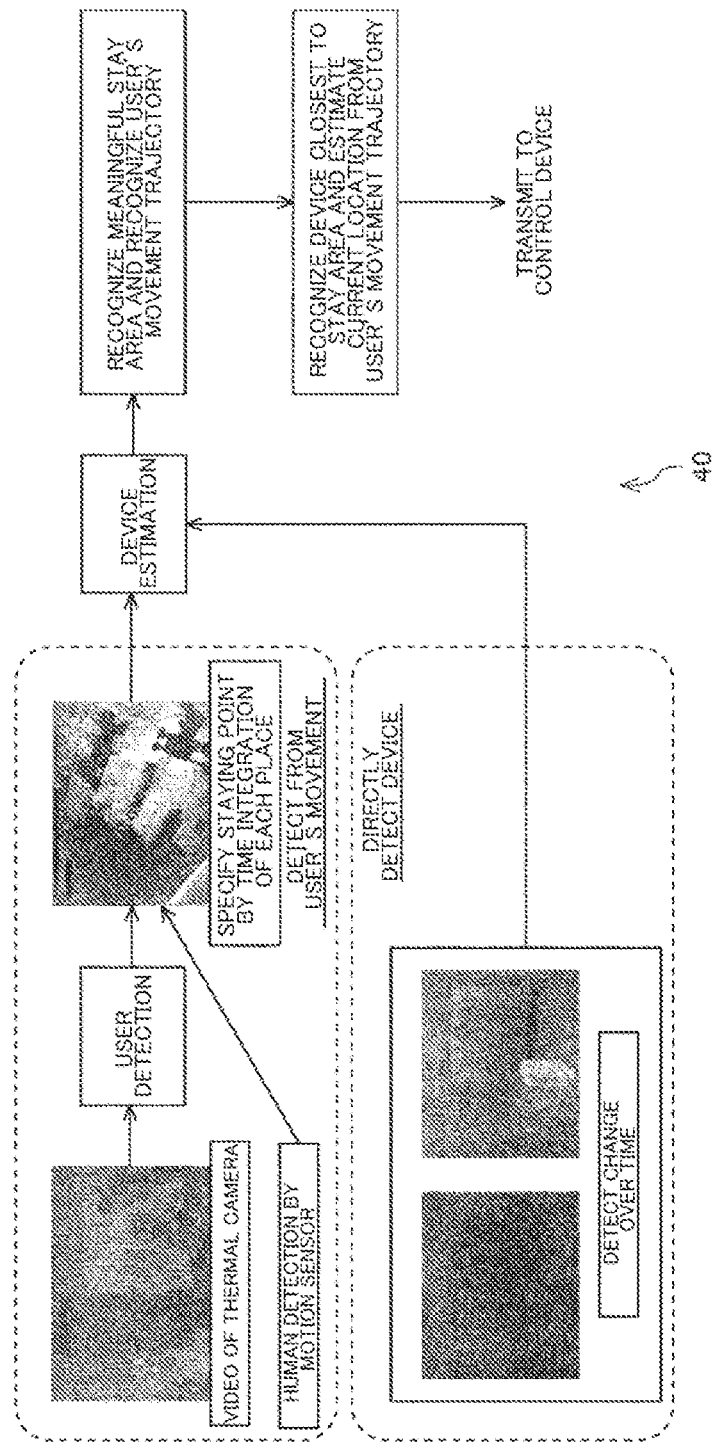
FIG. 16 is a diagram showing an example of recognition of a non-compliant device and a user using a monitoring device.

FIG. 16 shows an example of a configuration in which the device control system 1 uses a monitoring device 40 to supplement the position recognition of the non-compatible device and the recognition of the user's movement in a mixed environment in which non-compatible devices that are not IoT-enabled are installed.

In the monitoring device 40, the user's position from the image captured by the thermo camera and the user's position detected by the motion sensor are time-integrated, and the staying point where the user stays is specified according to the result of the time integration. In the monitoring device 40, it is estimated that some kind of home appliance (non-compliant device) exists at the staying point. In this way, the position of the non-compliant device can be estimated to some extent from the staying point of the user's movement.

The monitoring device 40 may detect a change over time in temperature from an image captured by a thermo camera, and estimate that some kind of home appliance (non-compatible device) exists at a place where the temperature changes according to the change over time in temperature.

In the monitoring device 40, the movement trajectory of the user is recognized by recognizing a meaningful stay area, and the home appliance (non-compliant device) closest to the stay area is recognized, whereby the current position is estimated from the movement trajectory of the user. The monitoring device 40 transmits a monitoring signal including information on the stay area (estimated position of the non-compliant device, current estimated position of the user, and the like) to the control device 10 via the network 30 or the like.

Based on the reply signal from the home appliance 20 and the monitoring signal from the monitoring device 40, the control device 10 specifies the device within a predetermined range from the device that last detected the user as the output target device. Specifically, in the control device 10, the elapsed time t obtained from the user's current estimated position or the like starting from the stay area (estimated position of the non-compliant device) is compared with the elapsed time t of the other home appliance 20. When the elapsed time t of the stay area is the smallest, the home appliance 20 within the range of the multiplication result of the unit distance r from the starting point and the elapsed time t is specified as the output target device.

As described above, in the device control system 1, the monitoring device 40 having a sensor such as a thermo camera is installed to detect the movement of the user, and the user detection can be performed using a non-compliant device that is not IoT-enabled using the staying state recognition data.

(Automatic Switching of Information Output)

By the way, the information that triggers the switching of the output target device may be the movement of the user instead of the control device 10.

For example, when a notification is issued from a messenger, a scheduler, or the like, the control device 10 triggers switching of the output target device. However, when a user who is watching a TV program on a TV receiver installed in the living room moves to the kitchen, cooks a dish, and transfers only the audio output of the TV program being watched to the home appliance 20 installed in the kitchen, the trigger information is different.

In this case, when the user moves to the kitchen and makes setting as to whether voice (sound) will track the user, the movement of the user becomes a trigger when voice is set to track the user. The reason for making this setting is that some users may not need the sound tracking.

After that, it is assumed that the user who is cooking moves a distance of several tens of centimeters to several meters in the space in the kitchen. In this case, when the user who is cooking moves a certain distance from the home appliance 20 that is currently outputting sound and approaches another home appliance 20, sound is output from the other home appliance 20 using the movement of the user as a trigger.

As a countermeasure for this, the packet shown in FIG. 10 is expanded, and "TRACKING" ("6") is added to the 8-bit Operation Code as shown in FIG. 17. In this way, the home appliance 20 that has received a tracking signal from the control device 10 uses its own sensor 223 to track the change in the user's position.

For example, when the control device 10 broadcasts a tracking signal, each home appliance 20 transitions to a mode in which the user's position information is intermittently updated. When another home appliance 20 for which a shorter elapsed time t is calculated than the home appliance 20 currently outputting sound appears, the output target device can be changed to the other home appliance 20.

Next, with reference to the flowcharts of FIGS. 18 and 19, the overall processing flow of the device control system 1 corresponding to the automatic switching of information output will be described.

(Processing Example of Control Device)

Figure 18:
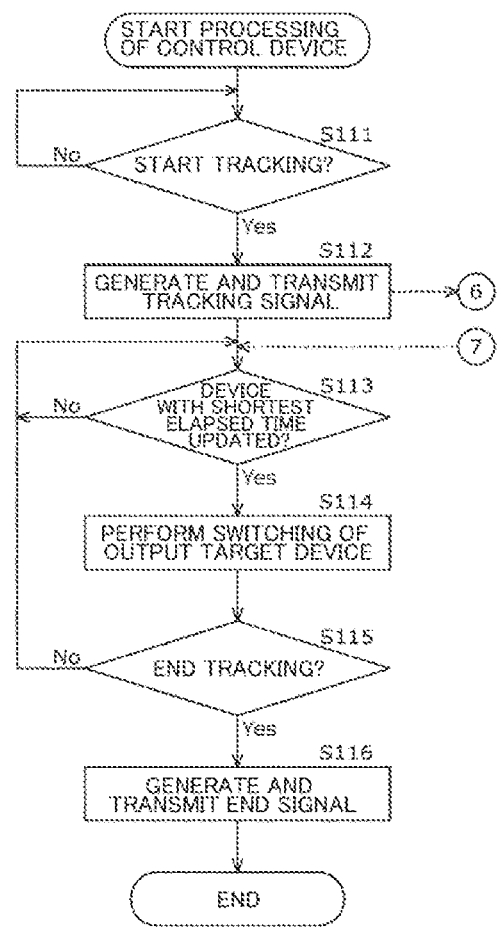
FIG. 18 is a flowchart illustrating an example of processing of a control device.

FIG. 18 is a flowchart illustrating an example of processing of the control device 10.

In step S111, the control unit 100 determines whether to start tracking based on the setting of whether to make the voice or the like track the user when the user moves.

If it is determined in the determination process of step S111 that tracking is to be started, the process proceeds to step S112.

In step S112, the packet generation unit 111 generates a tracking signal. In step S112, the network unit 105 broadcasts the generated tracking signal via the network 30 according to the control from the control unit 100.

A reply signal is transmitted from the home appliance 20 that has received the tracking signal via the network 30, and is received by the network unit 105.

In step S113, the packet analysis unit 112 determines whether a home appliance 20 having a shorter elapsed time t than the home appliance 20 that is currently outputting information such as sound has appeared based on information such as the elapsed time information included in the received reply signal and the home appliance 20 having the shortest elapsed time t has been updated.

If it is determined in the determination process of step S113 that the home appliance 20 having the shortest elapsed time t is not updated, the determination process is repeated until there is an update.

On the other hand, if it is determined in the determination process of step S113 that the home appliance 20 having the shortest elapsed time t is updated, the process proceeds to step S114.

In step S114, the output control unit 113 controls each unit such as the network unit 105 to switch the output target device, and switches the output target device to the home appliance 20 for which the shortest elapsed time t is calculated after the update.

In this way, for example, since the output target device is switched from the stove 20-5 to the microwave oven 20-2 according to the movement of the user, the user can listen the sound output from the microwave oven 20-2 at the nearest position.

In step S115, the control unit 100 determines whether to end the tracking. Here, for example, tracking can be terminated when the user disappears from a space such as a kitchen.

If it is determined in the determination process of step S115 that the tracking is continued without ending, the process returns to step S113, and the process of steps S113 to S115 described above is repeated.

If it is determined in the determination process of step S115 that the tracking is to be ended, the process proceeds to step S116.

In step S116, the packet generation unit 111 generates an end signal indicating the end of tracking. In step S116, the network unit 105 broadcasts the generated end signal via the network 30 according to the control from the control unit 100. When the process of step S116 ends, the process ends.

The processing flow of the control device 10 has been described above.

(Processing Example of Home Appliances)

Figure 19:
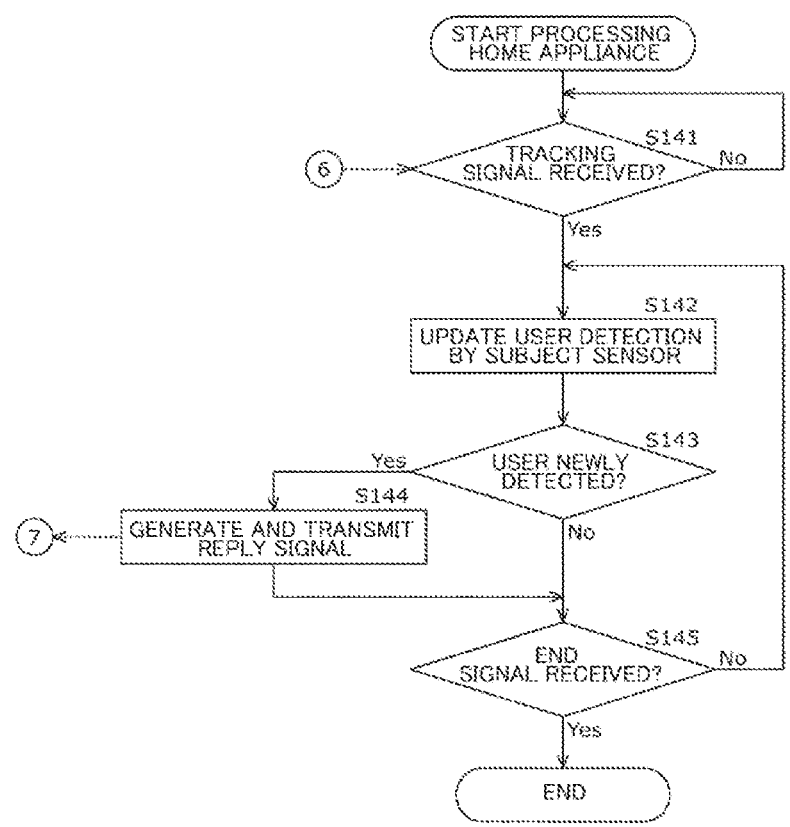
FIG. 19 is a flowchart illustrating an example of processing of a home appliance.

FIG. 19 is a flowchart illustrating an example of processing of the home appliance 20.

In step S141, the packet detection unit 211 determines whether the tracking signal transmitted from the control device 10 via the network 30 has been received. This tracking signal is transmitted in the process of step S112 of FIG. 18.

If it is determined in the determination process of step S141 that the tracking signal has been received, the process proceeds to step S142.

In step S142, the control unit 200 updates the user detection by its own sensor 223. In this way, the sensor data analysis unit 214 analyzes the sensor data from the sensor 223. The sensor 223 used here may be a motion sensor or another sensor.

In step S143, the sensor data analysis unit 214 determines whether a user has been newly detected based on the analysis result.

If it is determined in the determination process of step S143 that a user has been newly detected, the process proceeds to step S144.

In step S144, the packet generation unit 213 generates a reply signal including information such as user detection status information and elapsed time information based on the analysis result from the sensor data analysis unit 214. This user detection status information includes information regarding the detection status in which the user is intermittently detected. In addition, the elapsed time information includes information regarding the elapsed time when the user is intermittently detected.

In step S144, the network unit 205 transmits the generated reply signal to the control device 10 via the network 30 according to the control from the control unit 200.

On the other hand, if it is determined in the determination process of step S143 that the user has not been newly detected, the process proceeds to step S145.

In step S145, the packet detection unit 211 determines whether the end signal transmitted from the control device 10 has been received. This end signal is transmitted in the process of step S116 of FIG. 18.

If it is determined in the determination process of step S145 that the end signal has not been received, the process returns to step S142, and the above-mentioned process is repeated. That is, the home appliance 20 intermittently detects the position of the user until the end signal from the control device 10 is received, and continues to transmit the reply signal to the control device 10.

If it is determined in the determination process of step S145 that the end signal has been received, the process ends.

The processing flow of the home appliance 20 has been described above.

(Example of Information Output Switching Timing Control)

By the way, in the case of performing real-time processing such as user detection by the motion sensor of the home appliance 20 having a sensor level of Level 3, if the output target device is switched by a slight movement of the user, the switching may occur frequently occurs, which may be annoying. Therefore, a method for avoiding frequent switching of output target devices due to a slight movement of the user will be described below.

For example, in the kitchen, a case in which a user who is cooking in front of the stove 20-5 goes to pick up the ingredients stored in the refrigerator 20-1 will be discussed. In this case, when the microwave oven 20-2 is installed in (near) the user's movement path as shown in FIG. 3, if both the refrigerator 20-1 and the microwave oven 20-2 are IoT-enabled and have a motion sensor, they can detect the moving user.

At this time, if the home appliances 20 such as the refrigerator 20-1 and the microwave oven 20-2 installed in (near) the user's movement path react in sequence and output information, the user may feel annoyed.

Assuming such a case, the control device 10 measures the time (t1, t2, . . . ) elapsed after the user is detected by the home appliance 20 which is a candidate for the output target device. If the measured time exceeds a predetermined time threshold dt even when user detection is notified from another home appliance 20, the output target device is not switched. The other home appliance 20 here includes not only the home appliances 20 having a sensor level of Level 3 but also the home appliances 20 having a sensor level of Level 1 or 2.

By taking such measures, appropriate chattering prevention is realized, so that the user may not feel annoyed when the output target device is switched.

Figure 20:
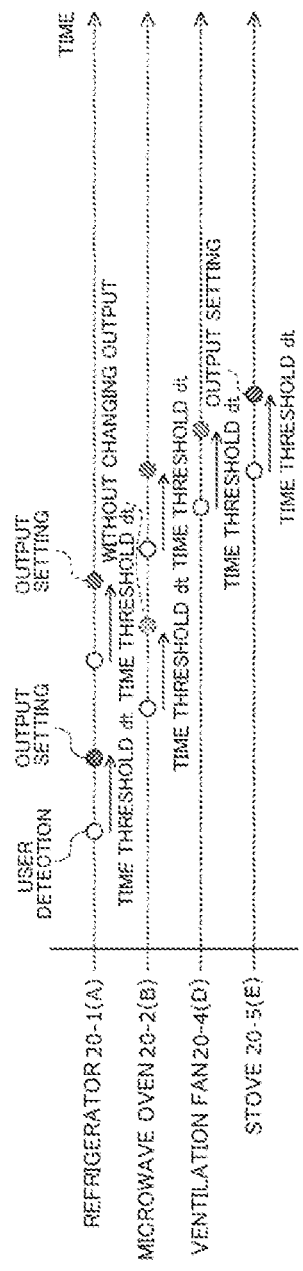
FIG. 20 is a timing chart showing an example of the timings of user detection and switching of an output target device.

The timing chart of FIG. 20 shows an example of the timings of user detection and switching of the output target device. Although the timings of each home appliance 20 are shown in FIG. 20, the direction of time is from the left side to the right side in the figure.

As shown in the timing chart (A) at the top, in the refrigerator 20-1(A), when the user is detected by the motion sensor, the output setting is made according to the control from the control device 10 when the measured time t1 exceeds the time threshold dt. In this way, the refrigerator 20-1(A) becomes the output target device and outputs information such as sound.

After that, as shown in the timing charts (A, B) on the top row and the second row from the top, in the microwave oven 20-2(B), the user was detected by the sensor 223 such as a motion sensor, but the user was detected again by the motion sensor in the refrigerator 20-1(A) before the measured time t2 exceeds the time threshold dt.

In this case, the control device 10 does not set the microwave oven 20-2(B) as the output target device, and sets the refrigerator 20-1(A) as the output target device when the measured time t1 exceeds the time threshold dt. In this way, the refrigerator 20-1(A) is continuously the output target device, and continuously outputs information such as sound.

After that, as shown in the timing charts (B, D, and E) of the second to fourth rows from the top, the moving user is continuously detected by the sensor 223 in the microwave oven 20-2(B), the ventilation fan 20-4(D), and the stove 20-5(E).

At this time, the user is detected in the microwave oven 20-2(B) and the ventilation fan 20-4(D), but they are not the output target device because the user is detected by the other home appliance 20 before the measured times t2 and t4 exceed the time threshold dt. That is, the refrigerator 20-1(A) is continuously the output target device, and continuously outputs information such as sound.

On the other hand, in the stove 20-5(E), the output setting is made according to the control from the control device 10 when the measured time t5 exceeds the time threshold dt after the user is detected. In this way, the output target device is switched from the refrigerator 20-1(A) to the stove 20-5(E), and information such as sound is output from the stove 20-5(E).

(Countermeasure Against Space Size)

For example, in the control device 10, when making determination of whether a certain elapsed time t has elapsed and the user "has disappeared from the kitchen", calculation of (unit distance r for each sensor level)×(elapsed time t) may not cope with rooms with various sizes.

In order to cope with such a room size or the like, a weighting coefficient a corresponding to a specific space may be multiplied. For example, in a kitchen having a size of 4 m² and a living room having a size of 25 m², the times required for leaving the space are different, and it is expected that the staying times as the user's movement patterns are different from each other.

Therefore, it is determined that the user has left the room when the following relational expression (1), in which the weighting coefficient a is added to the room exit determination formula, is established.

$$\text{(Unit distance } r\text{)} \times \text{(elapsed time } t\text{)} \times \text{(weighting coefficient } a\text{)} > \text{(threshold } d\text{)} \quad (1)$$

In the relational expression (1), the value of the weighting coefficient a may be arbitrarily set for each place by the user. However, since there is a certain degree of correlation with the number of square meters of the room, for example, the weighting coefficient of a=1 may be set based on the size of a toilet or the like that is assumed to be the smallest among the rooms, and the weighting coefficient a may be reduced in proportion to the number of square meters of other rooms.

In the above description, the home appliances 20 are exemplified by white goods such as refrigerators and microwave ovens, but the home appliances 20 may be configured as electric devices including devices such as white goods and electronic devices. Similarly, the control device 10 may be configured as an electric device including devices such as white goods and electronic devices. Further, it can be said that the electric device (control device 10, home appliance 20) to which the present technology is applied is an information processing device that processes various types of information.

As described above, in the device control system 1, the control device 10 specifies the home appliance 20 that is supposed to be close to the user as the output target according to the user's usage status of the home appliance 20 so that information can be output from the specified home appliance 20 regardless of whether the home appliance 20 has a motion sensor. Thus, it is possible to specify a more appropriate output target home appliance 20.

In addition, it is possible to automatically specify an output target home appliance from the usage status of existing home appliances (white goods) by taking the user's movement into consideration without receiving an active operation of the user and additionally introducing a motion sensor into a system. In this way, it is possible to provide an optimum viewing environment together with the video as well as the audio (sound) of the content, for example.

In particular, since the user does not need to perform any operation when specifying the output target home appliance, it is assumed that it will work effectively even in a situation where the hand is occupied or the hand is dirty, for example.

In addition, the present technology can also solve the problem of DLNA, which is a conventional viewing standard for network contents. That is, for example, even when the user who was watching a prerecorded content on a TV receiver installed in the living room moves to the kitchen to start cooking because it is time to eat, the user can continue to watch the content on a device such as a tablet terminal. In addition, even if the user moves to another room such as his/her room on the way, the user can continue to watch the content since the playback of the content is automatically switched to a device such as the tablet terminal or a TV receiver in his/her room.

The above-described PTL 1 proposes a system in which a motion sensor is provided at the entrance of a room and in the room, and the presence/absence of a user is determined by a combination of the user detection statuses of the two sensors.

Unlike the present technology, PTL 1 proposes a technology that assumes a state in which a dedicated motion sensor is grounded indoors, and aims to largely determine the two state of presence/absence of a user. The present technology also differs in that it also provides a method for specifying a home appliance present closest to the user in more detail.

PTL 2 described above proposes a system which includes a CPU and a memory that manage a motion sensor and a home appliance controller as a pair, and in which when it is detected that a user has moved from one room to another, a device in the destination room to which the user has moved from the original room is notified of the fact that a device in the original room is turned on so that the device in the original room is turned off as necessary.

The technology proposed in PTL 2 is different from the present technology in that the technology largely aims to detect the movement of a user from one room to another and thus introduce a motion sensor in a room, and control the power of a device in an original room.

The technologies of these two PTLs are provided with a motion sensor as a separate member to detect the user, and can only determine the presence/absence roughly by binary values. Thus, it is not possible to specify where the user is present in a large room such as the living room, the kitchen, and the like and what home appliance is closest to the user. Therefore, neither of the conventional technologies is suitable for the purpose illustrated in the present specification to specify the home appliance closest to the user and output information such as sound.

3. Configuration of Computer

Apart or all of the series of processing of the control device 10 and the home appliance 20 described above can be executed by hardware or software. In the case where the series of processing is executed by software, a program that configures the software is installed on a computer of each device.

Figure 21:
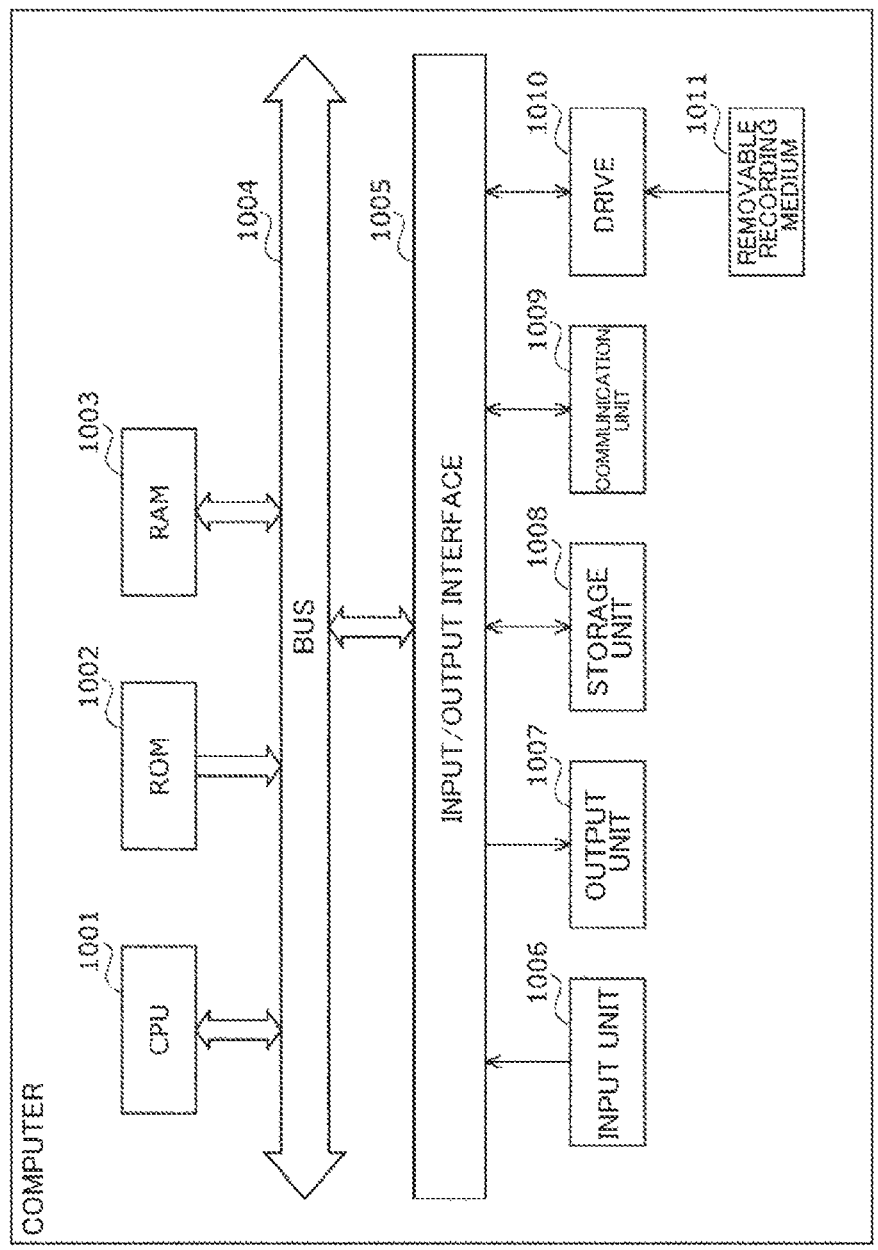
FIG. 21 is a diagram illustrating an example of a configuration of a computer.

FIG. 21 is a block diagram showing a hardware configuration example of a computer that executes a program to perform the above-described series of processing.

In the computer, a central processing unit (CPU) 1001, a read only memory (ROM) 1002, and a random access memory (RAM) 1003 are connected to each other by a bus 1004. An input/output interface 1005 is further connected to the bus 1004. An input unit 1006, an output unit 1007, a storage unit 1008, a communication unit 1009, and a drive 1010 are connected to the input/output interface 1005.

The input unit 1006 includes a microphone, a keyboard, a mouse, and the like. The output unit 1007 includes a speaker, a display, and the like. The storage unit 1008 includes a hard disk, a non-volatile memory, and the like. The communication unit 1009 is a network interface or the like. The drive 1010 drives a removable recording medium 1011 such as a magnetic disk, an optical disc, a magneto-optical disk, or a semiconductor memory.

In the computer that has the aforementioned configuration, for example, the CPU 1001 loads a program stored in the ROM 1002 and the storage unit 1008 to the RAM 1003 via the input/output interface 1005 and the bus 1004 and executes the program to perform the above-described series of processing.

The program executed by the computer (the CPU 1001) can be recorded on, for example, the removable recording medium 1011 serving as a package medium for supply. The program can be supplied via a wired or wireless transfer medium such as a local area network, the Internet, or digital satellite broadcasting.

In the computer, by mounting the removable recording medium 1011 on the drive 1010, it is possible to install the program in the storage unit 1008 via the input/output interface 1005. The program can be received by the communication unit 1009 via a wired or wireless transmission medium to be installed in the storage unit 1008. Further, the program can be installed in advance in the ROM 1002 or the storage unit 1008.

Here, processing executed by a computer according to a program is not necessarily performed according to a sequence described as a flowchart in the present description. That is, processing executed by a computer according to a program also includes processing executed in parallel or individually (e.g., parallel processing or processing according to objects).

In addition, a program may be processed by a single computer (processor) or may be processed by a plurality of computers in a distributed manner. Further, a program may be transmitted to a distant computer and executed.

Further, in the present description, the system means a set of a plurality of components (devices, modules (parts), etc.), and it does not matter whether or not all the components are arranged in a single housing. Thus, a plurality of devices accommodated in separate housings and connected via a network, and one device in which a plurality of modules are accommodated in one housing are both systems.

Embodiments of the present technology are not limited to the above-described embodiments and can be modified in various forms within the scope of the present technology without departing from the gist of the present technology. For example, the present technology can be configured as cloud computing in which one function is shared and processed in common by a plurality of devices via a network.

In addition, each step described in the above flowchart can be executed by one device or shared by a plurality of devices. Furthermore, in a case where a plurality of steps of processing are included in one step, the plurality of steps of processing included in one step may be executed by one device or by a plurality of devices in a shared manner.

The effects described in the present specification are merely illustrative and not limiting, and other effects may be obtained.

Note that the present technique may also have the following configurations.

(1) An information processing device including: a control unit that specifies an output target electric device that outputs information to a user based on a sensor level corresponding to a detection resolution of a sensor included in the electric device.

(2) The information processing device according to (1), wherein the control unit specifies the output target electric device from a plurality of electric devices based on an elapsed time since the user was detected by a sensor of each of the electric devices.

(3) The information processing device according to (2), wherein the sensor level has a first level including a sensor capable of directly detecting a position of the user and a second level including a sensor capable of indirectly detecting the position of the user, and a sensor having the second level has a longer elapsed time than a sensor having the first level.

(4) The information processing device according to (3), which when an electric device having the sensor having the first level is present in a specific space and the elapsed time is within a predetermined time, the control unit specifies the electric device as the output target electric device.

(5) The information processing device according to (3) or (4), wherein when an electric device having the sensor having the first level is not present in the specific space or when an electric device having the sensor having the first level is present but the elapsed time is not within the predetermined time, the control unit specifies an electric device having the sensor having the second level as the output target electric device.

(6) The information processing device according to (5), wherein when a plurality of electric devices having sensors having the second level are present, the control unit specifies an electric device having the shortest elapsed time as the output target electric device.

(7) The information processing device according to (6), wherein the control unit specifies one or a plurality of electric devices present within a range defined based on a position corresponding to an electric device having the shortest elapsed time as the output target electric device.

(8) The information processing device according to (7), wherein the second level is divided into a plurality of stages according to an operation frequency of the user, and the control unit specifies one or a plurality of electric devices present within a range defined by calculation of the elapsed time and a unit distance corresponding to the stage of the second level around a position corresponding to the electric device having the shortest elapsed time as the output target electric device.

(9) The information processing device according to (8), wherein the unit distance increases as the operation frequency of the user decreases.

(10) The information processing device according to (8) or (9), wherein the control unit estimates that the user has moved from the specific space when the calculation result of the elapsed time and the unit distance exceeds a predetermined threshold.

(11) The information processing device according to (10), wherein the control unit weights the calculation result according to the specific space when making threshold determination on the calculation result.

(12) The information processing device according to (1) to (11), further including: a communication unit that performs communication, wherein the communication unit transmits a trigger signal which is a communication request to the electric device via a network and receives a reply signal transmitted from the electric device having received the trigger signal, and the control unit specifies the output target electric device based on the reply signal.

(13) The information processing device according to (12), wherein the reply signal includes sensor level information regarding the sensor level, user detection status information regarding a detection status of the user, and elapsed time information regarding the elapsed time since the user was detected by the sensor included in each of the electric devices.

(14) The information processing device according to any one of (1) to (13), further including: a communication unit that performs communication, wherein the communication unit transmits a tracking signal for tracking a positional change of the user and receives a reply signal transmitted from the electric device having received the tracking signal, and the control unit changes the current output target electric device to another electric device based on the reply signal when there is the other electric device whose elapsed time since the user was detected by a sensor included in each of the electric devices is shorter than the elapsed time of the current output target electric device.

(15) The information processing device according to (14), wherein the reply signal includes user detection status information regarding a detection status in which the user is intermittently detected and elapsed time information regarding the elapsed time when the user is intermittently detected.

(16) The information processing device according to (1) to (15), wherein the control unit measures the time elapsed since the user was detected by an electric device that is a candidate for the output target electric device when the output target electric device is specified, and changes the output target electric device to the electric device when the measured time exceeds a time threshold.

(17) The information processing device according to any one of (3) to (11), wherein the sensor having the first level includes a motion sensor, and the sensor having the second level includes a sensor capable of detecting an operation of the user.

(18) The information processing device according to any one of (1) to (17), wherein the information includes information regarding sound, an image, a message, or a schedule.

(19) An information processing method for allowing an information processing device to specify an output target electric device that outputs information to a user based on a sensor level corresponding to a detection resolution of a sensor included in the electric device.

(20) A program for causing a computer to function as an information processing device including a control unit that specifies an output target electric device that outputs information to a user based on a sensor level corresponding to a detection resolution of a sensor included in the electric device.

(21) An information processing device including: a sensor; and a communication unit that receives a trigger signal which is a communication request transmitted from an electric device and transmits a reply signal which is a reply to the trigger signal to the electric device, the reply signal including information regarding the sensor for specifying an output target electric device that outputs information to a user, wherein a sensor level corresponding to a detection resolution of the sensor is assigned.

REFERENCE SIGNS LIST

1 Device control system
10 Control device
20, 20-1 to 20-5 Home appliance
100 Control unit
101 Input unit
102 Output unit
103 I/F unit
104 Storage unit
105 Network unit 111 Packet generation unit
112 Packet analysis unit
113 Output control unit
121 Touch panel
122 Button
131 Display
132 Speaker
200 Control unit
201 Input unit
202 Output unit
203 I/F unit
204 Storage unit
205 Network unit
211 Packet detection unit
212 Packet analysis unit
213 Packet generation unit
214 Sensor data analysis unit
215 Profile control unit
1001 CPU

The invention claimed is:

1. An information processing device, comprising:
a control unit configured to specify an output target electric device from a plurality of electric devices based on:
a sensor level that corresponds to a detection resolution of a sensor included in each of the plurality of electric devices, and
an elapsed time since a detection of a user by the sensor included in each of the plurality of electric devices, wherein the output target electric device is configured to output information to the user.

2. The information processing device according to claim 1, wherein
the sensor level has a first level that corresponds to at least a first sensor that is capable of direct detection of a position of the user and a second level that corresponds to at least a second sensor capable of indirect detection of the position of the user, and
a second elapsed time of the at least second sensor is longer than a first elapsed time of the at least first sensor.

3. The information processing device according to claim 2, wherein
in a case where an electric device of the plurality of electric devices that includes the at least first sensor having the first level is present in a specific space and the elapsed time is within a specific time, the control unit is further configured to specify the electric device as the output target electric device.

4. The information processing device according to claim 2, wherein
in a case where an electric device of the plurality of electric devices that includes the at least first sensor having the first level is not present in a specific space or in a case where an electric device of the plurality of electric devices that includes the at least first sensor having the first level is present but the elapsed time is not within a specific time, the control unit is further configured to specify an electric device of the plurality of electric devices that includes the at least second sensor having the second level as the output target electric device.

5. The information processing device according to claim 4, wherein in a case where the plurality of electric devices that includes the at least second sensor having the second level are present, the control unit is further configured to specify an electric device of the plurality of electric devices that has a shortest elapsed time among the elapsed time of each of the plurality of electric devices as the output target electric device.

6. The information processing device according to claim 5, wherein the control unit is further configured to specify at least one of the plurality of electric devices present within a range defined based on a position corresponding to the electric device having the shortest elapsed time.

7. The information processing device according to claim 6, wherein
the second level is divided into a plurality of stages based on an operation frequency of the user, and
the control unit is further configured to specify the at least one of plurality of electric devices present within the range defined based on calculation of the elapsed time and a unit distance corresponding to a stage of the plurality of stages of the second level around the position corresponding to the electric device having the shortest elapsed time.

8. The information processing device according to claim 7, wherein the unit distance increases as the operation frequency of the user decreases.

9. The information processing device according to claim 7, wherein the control unit is further configured to estimate that the user has moved from the specific space based on a calculation result of the elapsed time and the unit distance that exceeds a specific threshold.

10. The information processing device according to claim 9, wherein the control unit is further configured to weight the calculation result based on the specific space in case of threshold determination on the calculation result.

11. The information processing device according to claim 1, further comprising:
a communication unit configured to:
transmit a trigger signal which is a communication request to each of the plurality of electric devices via a network; and
receive a reply signal transmitted from each of the plurality of electric devices having received the trigger signal, wherein
the control unit is further configured to specify the output target electric device from the plurality of electric devices based on the reply signal.

12. The information processing device according to claim 11, wherein the reply signal includes at least one of sensor level information regarding the sensor level, user detection status information regarding a detection status of the user, or elapsed time information regarding the elapsed time since the detection of the user by the sensor included in each of the of the plurality of electric devices.

13. The information processing device according to claim 1, further comprising:
a communication unit configured to:
transmit a tracking signal to track a positional change of the user; and
receive a reply signal from an electric device of the plurality of electric devices that received the tracking signal, wherein
the control unit is further configured to change the output target electric device to a new electric device among the plurality of electric devices based on the reply signal, and
the output target electric device is changed to the new electric device in a case where the elapsed time of the new electric device is shorter than the elapsed time of the output target electric device.

14. The information processing device according to claim 13, wherein the reply signal includes at least one of user detection status information regarding a detection status in which the user is intermittently detected or elapsed time information regarding the elapsed time in a case where the user is intermittently detected.

15. The information processing device according to claim 1, wherein the control unit is further configured to:
   measure the elapsed time since the detection of the user by an electric device of the plurality of electric devices that is a candidate for the output target electric device in a case where the output target electric device is specified, and
   change the output target electric device to the electric device that is the candidate for the output target electric device in a case where the measured elapsed time exceeds a time threshold.

16. The information processing device according to claim 2, wherein
   the at least first sensor having the first level includes a motion sensor, and
   the at least second sensor having the second level includes a sensor capable of detection of an operation of the user.

17. The information processing device according to claim 1, wherein the information includes information regarding at least one of sound, an image, a message, or a schedule.

18. An information processing method, comprising:
   in an information processing device that includes a control unit:
      specifying, by the control unit, an output target electric device from a plurality of electric devices based on;
      a sensor level that corresponds to a detection resolution of a sensor included in each of the plurality of electric devices, and
      an elapsed time since a detection of a user by the sensor included in each of the plurality of electric devices,
      wherein the output target electric device is configured to output information to the user.

19. A non-transitory computer-readable medium having stored thereon, computer executable instructions, which when executed by a processor, cause the processor to execute operations, the operations comprising:
   specifying an output target electric device from a plurality of electric devices based on:
   a sensor level that corresponds to a detection resolution of a sensor included in each of the plurality of electric devices, and
   an elapsed time since a detection of a user by the sensor included in each of the plurality of electric devices,
   wherein the output target electric device is configured to output information to the user.

* * * * *